US010359797B2

(12) United States Patent
Carlson

(10) Patent No.: US 10,359,797 B2
(45) Date of Patent: Jul. 23, 2019

(54) WEATHER TRACKING IN A PHOTOVOLTAIC ENERGY GENERATION SYSTEM

(71) Applicant: SolarCity Corporation, San Mateo, CA (US)

(72) Inventor: Eric Daniel Carlson, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 402 days.

(21) Appl. No.: 14/960,271

(22) Filed: Dec. 4, 2015

(65) Prior Publication Data
US 2016/0320787 A1 Nov. 3, 2016

Related U.S. Application Data

(60) Provisional application No. 62/155,444, filed on Apr. 30, 2015.

(51) Int. Cl.
G05F 1/67 (2006.01)
G05B 15/02 (2006.01)
(Continued)

(52) U.S. Cl.
CPC .............. G05F 1/67 (2013.01); G05B 15/02 (2013.01); H02J 7/007 (2013.01); H02J 7/0052 (2013.01);
(Continued)

(58) Field of Classification Search
None
See application file for complete search history.

(56) References Cited

U.S. PATENT DOCUMENTS 8,310,205 B1 11/2012 Hamburgen
2010/0198420 A1* 8/2010 Rettger ............... G01W 1/10
700/291
(Continued)

FOREIGN PATENT DOCUMENTS

EP 2584668 A1 4/2013
EP 2587611 A2 5/2013
WO 2014170800 A1 10/2014

OTHER PUBLICATIONS

Williams, Christopher et al.; "Battery Charge Control Schemes for Increased Grid Compatability of Decentralized PV Systems"; 28th European Photovaltaic Solar Entergy Conference; 2013; Subject 5.1; 6 pages.
(Continued)

Primary Examiner — Bernard G Lindsay
(74) Attorney, Agent, or Firm — Kilpatrick Townsend & Stockton LLP

(57) ABSTRACT

A computer-implemented method includes receiving power measurement data for a photovoltaic (PV)-based energy generation (EG) sites, determining if cloud cover is present over the EG site based on a difference between a present and historical power output for the EG site, calculating a density of the cloud cover over the EG site based on the present and historical power outputs, and controlling load characteristics of the EG site based on the determined presence and calculated density of the cloud cover. The density of the cloud cover is based on a percentage difference in power output between the present power output and the historical power output. A vector for the cloud cover can be determined based on movement of a detected storm system with a boundary defined by a location of a plurality of EG sites, or by a movement of the cloud density from one EG site to the next.

15 Claims, 20 Drawing Sheets

(51) Int. Cl.
   *H02J 7/00*   (2006.01)
   *H02J 7/35*   (2006.01)
   *H02M 7/44*   (2006.01)

(52) U.S. Cl.
   CPC ................. *H02J 7/35* (2013.01); *H02M 7/44* (2013.01); *Y02E 10/58* (2013.01)

(56) References Cited

U.S. PATENT DOCUMENTS

| | | | |
|---|---|---|---|
| 2010/0204844 A1 | 8/2010 | Rettger et al. | |
| 2011/0106328 A1* | 5/2011 | Zhou .................... | G05B 13/024 700/291 |
| 2011/0282514 A1* | 11/2011 | Ropp ..................... | H02J 3/383 700/297 |
| 2012/0016528 A1 | 1/2012 | Raman et al. | |
| 2013/0035813 A1 | 2/2013 | Kusumi | |
| 2013/0176000 A1 | 7/2013 | Bishop et al. | |
| 2014/0049109 A1 | 2/2014 | Kearns et al. | |
| 2014/0083413 A1* | 3/2014 | Bibi ....................... | G01W 1/02 126/601 |
| 2014/0149038 A1* | 5/2014 | Cronin ................... | G01W 1/10 702/3 |
| 2014/0207437 A1* | 7/2014 | Hoff ....................... | H02S 50/10 703/18 |
| 2015/0001945 A1 | 1/2015 | Estes | |
| 2015/0134251 A1* | 5/2015 | Bixel ..................... | G05B 13/04 702/3 |
| 2015/0241896 A1* | 8/2015 | Nishibayashi ......... | G05B 15/02 700/286 |
| 2015/0278968 A1* | 10/2015 | Steven ................... | G06Q 50/06 705/7.35 |

OTHER PUBLICATIONS

Giraud, Francois; "Analysis of the Effects of a Passing Cloud on a Grid-Interactive Photovoltaic System with Battery Storage using Neural Networks"; IEEE Transactions on Energy Conversion; 1999; vol. 14, No. 4; pp. 1572-1577.

International Search Report and Written Opinion dated Jun. 27, 2016 in International Application No. PCT/US2016/027959. 13 pages.

International Preliminary Report on Patentability dated Nov. 9, 2017 for International Application No. PCT/US2016/027959, filed Apr. 15, 2016. 8 pages.

Non-Final Office Action dated Dec. 15, 2017 in U.S. Appl. No. 14/960,283, filed Dec. 4, 2015. 23 pages.

Final Office Action dated Jul. 13, 2018 in U.S. Appl. No. 14/960,283, filed Dec. 4, 2015. 30 pages.

\* cited by examiner

WEATHER TRACKING IN A PHOTOVOLTAIC ENERGY GENERATION SYSTEM

CROSS REFERENCE TO RELATED APPLICATIONS

This claims the benefit of U.S. Provisional Application No. 62/155,444, filed Apr. 30, 2015, which is hereby incorporated by reference for all purposes.

BACKGROUND

In recent years, climate change concerns, federal/state initiatives, and other factors have driven a rapid rise in the installation of renewable energy generation (EG) systems (i.e., systems that generate energy using renewable resources such as solar, wind, hydropower, etc.) at residential and non-residential sites. Solar photovoltaic (PV) systems, in particular, have been very popular EG systems.

PV-based EG systems have continued to improve as new innovations lead to lower manufacturing and installation costs, higher solar panel efficiencies, and greater control over energy distribution. Despite these improvements, the power output for PV-based EG systems remain susceptible to bad weather conditions, including storm systems and dense cloud cover. Bad weather conditions can greatly reduce an amount of sunlight that reaches PV-based EG systems, which can adversely affect their corresponding power generation.

Therefore, knowing beforehand which EG sites will be affected by an impending storm or dense cloud cover can be very advantageous, as preemptive actions can be taken to reduce the storms negative effects on power production. However, conventional methods of storm forecasting for downstream EG sites are typically inaccurate, costly, and involve indirect calculations, broad assumptions, and imprecise estimations. As such, better forecasting and control systems are needed.

BRIEF SUMMARY

In certain embodiments, a computer-implemented method includes receiving power measurement data for a PV-based EG site, determining if cloud cover is present over the EG site based on the present and historical power outputs for the EG site, calculating a density of the cloud cover over the EG site based on the present and historical power outputs for the EG site, and controlling load characteristics of the EG site based on the determined presence and calculated density of the cloud cover. The power measurement data can include a present power output of the EG site, and a historical power output of the EG site. In some implementations, the power measurement data corresponding to the present power output of the EG site is received from the EG site, and the power measurement data corresponding to the historical power output of the EG site is received from a database. The historical power output can be an average power output for the EG site for a previous period of time.

In some embodiments, the method further includes calculating a difference between the present power output and the historical power output for the EG site, where cloud cover can be determined to be present over the EG site if the difference between the present power output and historical power output of the EG site is greater than a predetermined threshold value for cloud cover. Calculating the density of the cloud cover can be based on a percentage difference in power output between the present power output and the historical power output. The controlled load characteristics of the EG site can include at least one of a charging profile for an energy storage device associated with the EG site or a time-shifting load profile of the EG site. Furthermore, the charging profile for the energy storage device can include an increased charge set point when cloud cover is determined to be present and the cloud cover density is greater than a predetermined threshold value for cloud density.

Certain embodiments may further include receiving weather forecast data, determining a vector of the determined cloud cover based on the weather forecast data, determining one or more EG sites in a path of the cloud cover based on the determined vector, and controlling load characteristics of the one or more EG sites in the path of the cloud cover based on the determined presence and calculated density of the cloud cover over the EG site.

In further embodiments, a system can include one or more processors, and one or more non-transitory computer-readable storage mediums containing instructions configured to cause the one or more processors to perform operations that can include receiving, by a processor, power measurement data for a PV-based EG site, calculating a difference between the present power output and the historical power output for the EG site, determining if cloud cover is present over the EG site based on the difference between the present and historical power outputs for the EG site, calculating a percentage difference between the present power output and the historical power output for the EG site, calculating a density of the cloud cover over the EG site based on a percentage difference between the present and historical power outputs for the EG site, and controlling a charging profile for an energy storage device associated with the EG site based on the determined presence and density of the cloud cover over the EG site. The power measurement data can include a present power output of the EG site, and a historical power output of the EG site.

In some embodiments, the power measurement data corresponding to the present power output of the EG site is received from the EG site, and the power measurement data corresponding to the historical power output of the EG site is received from a database. The historical power output can be an average power output for the EG site for a previous predetermined period time. In some cases, the cloud cover can be determined to be present over the EG site if the difference between the present power output and historical power output of the EG site is greater than a predetermined threshold value for cloud cover. The charging profile for the energy storage device can include an increased charge set point when cloud cover is determined to be present and the cloud cover density is greater than a predetermined threshold value for cloud density.

In certain embodiments, the system can further include receiving weather forecast data, determining a vector of the determined cloud cover based on the weather forecast data, determining one or more EG sites in the path of the cloud cover based on the determined vector, and controlling load characteristics of the one or more EG sites in the path of the cloud cover based on the determined presence and calculated density of the cloud cover over the EG site.

In further embodiments, a method includes receiving, by a processor, power measurement data for a plurality of PV-based EG sites, where the power measurement data can include a present power output of each of the plurality of EG sites, and a historical power output of each of the plurality of EG sites. The method can further include calculating, by the processor, a density of cloud cover over each EG site based on a percentage difference between a present power output and historical power output for the corresponding EG site, determining, by the processor, that a density of cloud cover at a first EG site of the plurality of EG sites exists at a second EG site of the plurality of EG sites after a period of time, calculating, by the processor, a vector path for the cloud cover, determining, by the processor, a third EG site of the plurality of EG sites having a location in the vector path of the cloud cover, and forecasting, by the processor, an effect on a power output of the third EG site. The vector path for the cloud cover can be based on a location of the first EG site, a location of the second EG site, and the period of time.

The method can further include controlling, by the processor, an EG distribution profile for the third EG site based on the forecast. The EG distribution profile can be based, in part, on the density of cloud cover at the first EG site or second EG site. The EG distribution profile can correspond to a charging profile for an energy storage device associated with the third EG site. In some cases, the density of cloud cover at the first EG site exists at the second EG site if the density of cloud cover at the second EG site is within a threshold tolerance of the density of cloud cover at the first EG site.

In certain embodiments, the vector path can be calculated based on a distance between the location of the first EG site and the location of the second EG site, a direction of the second EG site with respect to the first EG site, and the period of time corresponding to an amount of time it takes for the density of cloud cover at the second EG site to substantially match the density of cloud cover at the first EG site.

In further embodiments, a method includes receiving, by a processor, power measurement data for a plurality of PV-based EG sites, where each EG site can have a corresponding location. The power measurement data can include a present power output of each of the plurality of EG sites, and a historical power output of each of the plurality of EG sites. The method can further include determining a bounded area defined by the locations of the plurality of EG sites, determining if cloud cover is present over each of the plurality of EG sites based on their corresponding present power outputs and historical power outputs, determining if at least an edge of the cloud cover is contained with the bounded area, calculating a vector based on a movement of the edge of the storm system within the bounded area, identifying a downstream EG site in the vector path of the storm system, and controlling an EG distribution profile for the downstream EG site based power characteristics of the EG sites of the plurality of EG sites within the storm system.

The method may further include calculating a density of cloud cover over each EG site within the storm system based on a percentage difference between a present power output and historical power output for the corresponding EG site, where controlling the EG distribution profile for the downstream EG site is further based on the density of cloud cover over each EG site within the storm system.

BRIEF DESCRIPTION OF THE DRAWINGS

The detailed description is set forth with reference to the accompanying figures.

DETAILED DESCRIPTION

Figure 1:
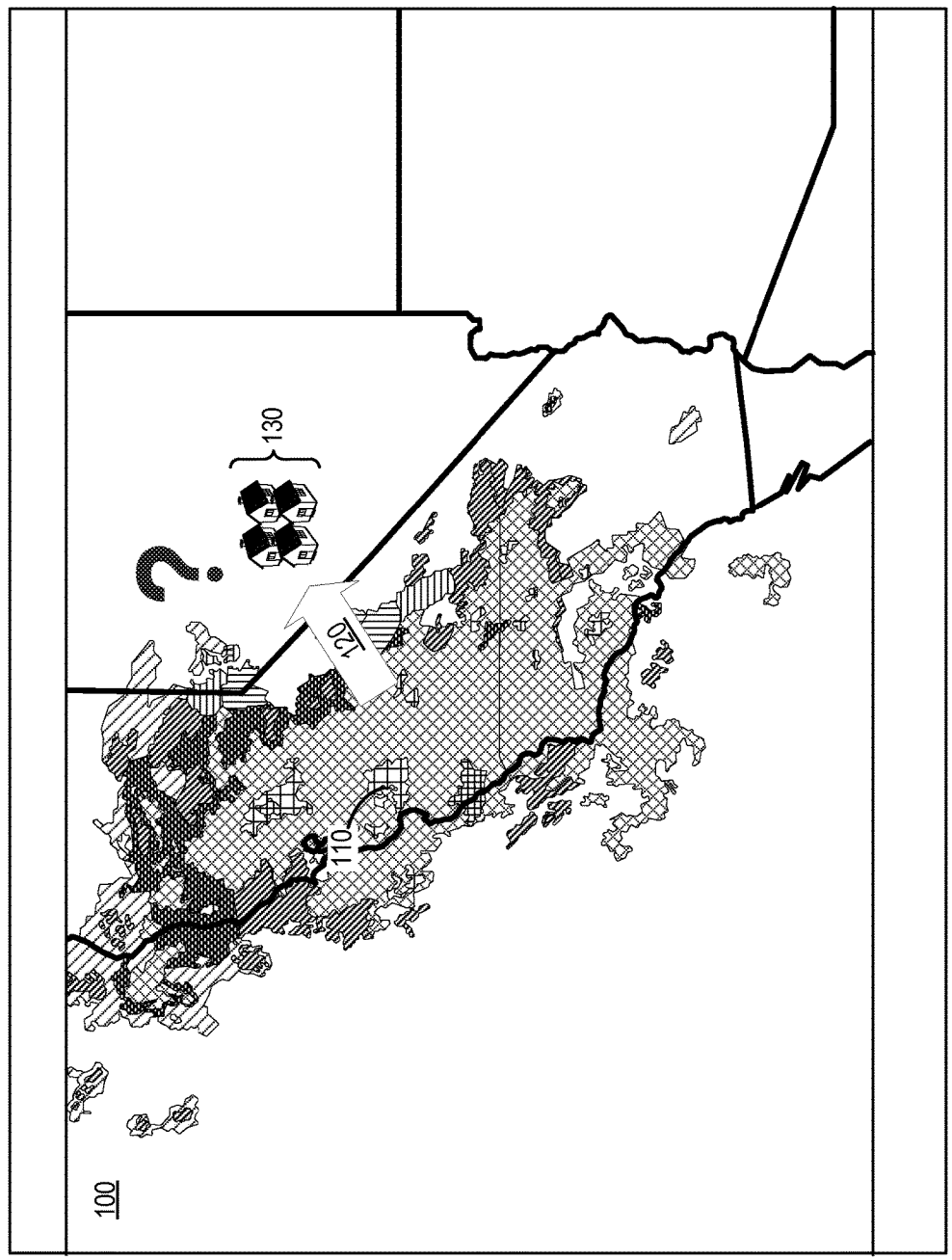
FIG. 1 shows aspects of a weather tracking system based on satellite imagery.

The present disclosure relates in general to energy generation systems, and in particular to tracking weather patterns and forecasting their effect on energy generation using such systems.

In the following description, various embodiments of PV-based EG systems will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The power output in a PV-based energy generation system (e.g., an EG site) can be affected by weather conditions. EG systems may produce more power during sunny days rather than cloudy days as more photons reach the PV-panels (i.e., solar panels) and are converted into electrical power. In a grid-connected network, it can be useful to know not only the existence and location of a weather pattern relative to the network, but also how dense the cloud cover will be, as well as its speed and direction. Such information can be used to characterize how the weather will affect power output in EG systems and forecast which EG systems will be affected downstream. Furthermore, with this information, certain preemptory actions could be taken to better accommodate a predicted future reduction in energy generation. For instance, some EG systems may pre-charge an energy storage system (e.g., battery) or apply a different charging profile to an energy storage system. Thus, certain embodiments can track weather patterns by using power output data from a number of EG sites in a grid to determine where clouds are relative to the grid, in addition to their speed, direction, and density at virtually any point within the system. A forecast can be generated based on these inputs to predict where the weather system is headed as well as its quantifiable effect on power outputs for downstream PV-based energy generation systems.

Thus, aspects of the present disclosure relate to systems and methods for receiving power measurement data for a PV-based EG site, determining if cloud cover is present over the EG site based on a difference between a present and historical power output for the EG site, calculating a density of the cloud cover over the EG site based on the present and historical power outputs, and controlling load characteristics of the EG site based on the determined presence and calculated density of the cloud cover. The density of the cloud cover can be based on a percentage difference in power output between the present power output and the historical power output. A vector for the cloud cover can be determined based on movement of a detected storm system with a boundary defined by a location of a plurality of EG sites, or by a movement of the cloud density from one EG site to another.

For purposes of illustration, several of the examples and embodiments that follow are described in the context of EG systems that use solar PV-based technology for energy generation and battery technology for energy storage. However, it should be appreciated that embodiments described herein are not limited to such implementations. For example, in some embodiments, alternative types of energy generation technologies (e.g., wind turbine, solar-thermal, geothermal, bio-mass, hydropower, etc.) may be used in conjunction with PV-based systems. In some embodiments, alternative types of energy storage technologies (e.g., compressed air, flywheels, pumped hydro, superconducting magnetic energy storage (SMES), etc.) can be used. One of ordinary skill in the art will recognize many modifications, variations, of the concepts described herein to such modification variations, and alternatives.

Conventional Systems

Some conventional systems that use weather tracking to forecast weather effects on downstream EG systems do exist, but suffer significant shortcomings. For example, some systems are not scalable. Some are too expensive and require repeated maintenance. Some can track the location of storm systems (e.g., clouds), but cannot track a vector (i.e., speed and direction) or density, which can impact the amount of sunlight that can reach PV panels in EG systems. Furthermore, conventional systems provide no real direct correlation to the actual effects of weather systems on EG system power outputs and rely on indirect first-order estimations and assumptions to calculate what local and downstream EG systems may endure. Some conventional systems are described here.

FIG. 1 shows aspects of a weather tracking system based on satellite imagery 100.

Weather system 110 includes storm weather patterns and dense cloud cover and is shown over a region of California. Satellite imagery (e.g., Doppler radar) can be scalable and cost effective since detailed weather patterns are freely available and can cover any location on earth. Furthermore, satellite imagery can be used to accurately measure the location of a weather system (sometimes in near real-time) and to predict its vector (i.e., speed and direction). For instance, satellite imagery 100 shows a direction 120 of weather system 110, which can be used to predict if PV-powered residential area 130 will be affected by the storm. This may be useful for binary decisions to determine whether or not to take preemptory actions, such as setting a new charge point on an energy storage device in a downstream EG system, as further discussed below at least with respect to FIGS. 14-19.

Despite the advantages, satellite imagery cannot be used to reliably determine an accurate cloud density at any point in a weather system, and it is particularly bad when used to correlate the effects of a weather system to an actual power output of an EG system. Determining a relative cloud density in a weather system can be effective. For instance, a pixel may be twice as dark as another pixel, so the cloud cover may also be approximately twice dense. However, there are problems with calibrating such systems to no cloud conditions and establishing a baseline. Typical satellite imagery-based systems can confuse snow cover with clouds or other highly reflective surfaces. Different climates may be more reflective to start with. For instance, a southwestern desert in the U.S. may be more reflective than forestland in the Pacific Northwest. Even with future improvements in technology, any correlation of cloud cover to an EG system power output would still be based on a number of assumptions and estimations for a host of complex and variable inputs and conditions (e.g., resolution of imagery versus individual EG system performance, actual sunlight reaching PV panels unencumbered by reflections and other noise), as would be appreciated by one of ordinary skill in the art.

Figure 2:
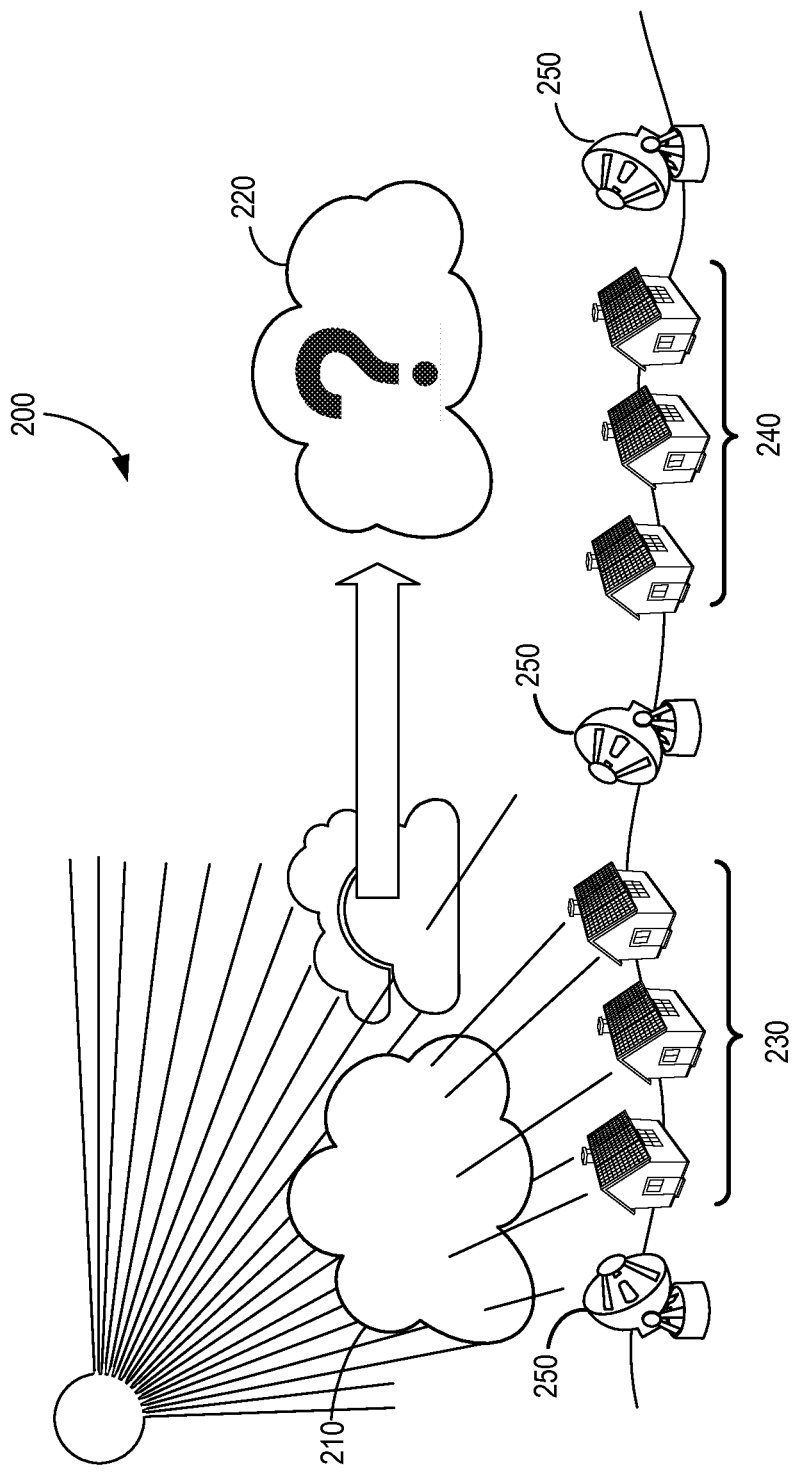
FIG. 2 shows aspects of a weather tracking system using ground-based sensors.

FIG. 2 shows aspects of a weather tracking system 200 using ground-based sensors ("sensors") 250. Storm clouds 210 are located over PV-powered residential area 230 and block an amount of sunlight. Ground-based sensors 250 can be high-precision scientific instruments that measure sunlight in a particular location. Ground-based sensors 250 can be very expensive (e.g., $5K-$15K per unit) and require a significant amount of manpower to deploy and maintain. Thus, scalability is severely limited and cost prohibitive for grid-connected EG sites that span regionally or nationally and may number in the hundreds of thousands. Moreover, maintenance workers have to routinely service and maintain the sensors for further scaled expenses.

Solar measurements made by ground-based sensors can be very accurate, however some inaccuracies are inevitable due to reflected sunlight from clouds or other reflective surfaces. Since sensors 250 only measure sunlight, they may indirectly measure an amount of cloud cover based on the amount of sunlight received. High amounts of sunlight may correspond to relatively clear skies and low levels may indicate cloudy days. Thus, sensors 250 can reliably measure the presence of clouds (i.e., location), as sunlight measurements may be compared to a threshold value to determine if clouds are present, as would be appreciated by one of ordinary skill in the art. However, sensors 250 in conventional configurations cannot detect a vector of a weather system as a sunlight measurement provides no sense of a speed or direction of cloud cover. Thus, system 200 could not reliably determine if and when clouds 220 would affect PV-powered residential area 240. Furthermore, despite any improvements in solar measurement accuracy, solar measurement data is used to indirectly calculate an expected power generation at an EG site, which includes estimations, assumptions, and characterizations (e.g., solar conversion parameters for individual panels/systems, etc.) that introduce error in the calculation. It should be noted that, in some embodiments, aspects can be used in conjunction with a network of sensors 250 as further described below at least with respect to FIGS. 7-9.

Cloud density measurements using ground-based sensors 250 may be more accurate than satellite-based systems (see, e.g., FIG. 1). Sunlight measurements may provide a more direct indication of how EG systems will be affected (e.g., energy generation). Estimations of energy generation for PV-based systems can be directly calculated using solar measurement data, as would be appreciated by one of ordinary skill in the art. In contrast, satellite-based weather tracking is more indirect (i.e., inaccurate) as it first estimates a cloud density, which in turn is used to estimate a power output for PV-based EG systems. Thus, ground-based sensors systems tend to provide more accurate estimations of PV-based EG system power outputs. However, the limitations in scalability and forecasting downstream effects limit its use to small-scale use.

Figure 3:
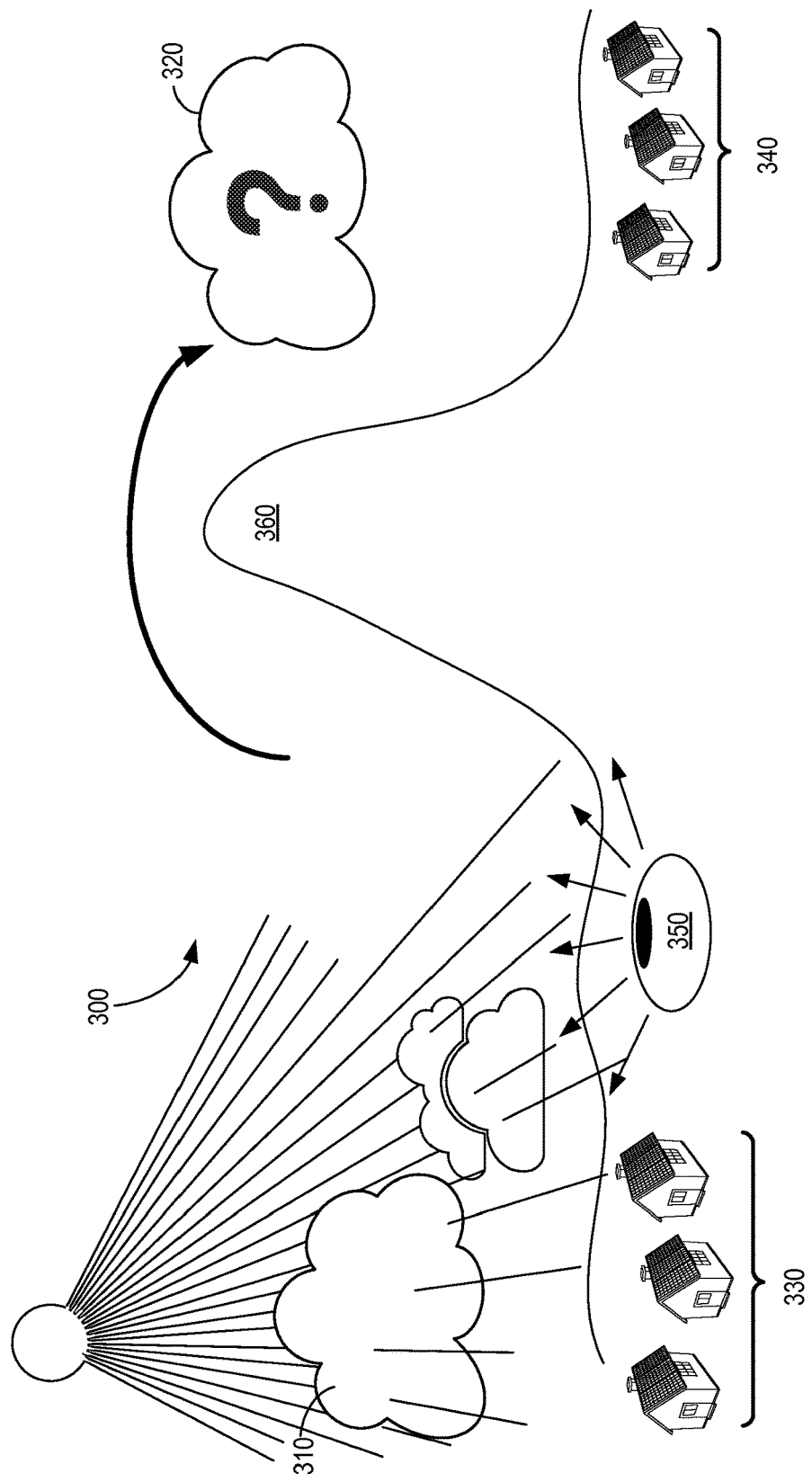
FIG. 3 shows aspects of a weather tracking system using a ground-based fisheye image sensor.

FIG. 3 shows aspects of a weather tracking system 300 using a ground-based fisheye image sensor ("fisheye sensor") 350. Storm clouds 310 are located over PV-powered residential area 330 and block an amount of sunlight. Fisheye sensor 350 can be a visual spectrum wide lens camera that takes images of the sky and uses imaging processing algorithms to infer how much cloud cover there is and how it travels across the sky for a particular location. One limitation is that fisheye sensor 350 is a line-of-sight sensor and cannot directly detect the presence of cloud 320 over residential area 340, although it may infer a future forecasted presence based on presence and vector detection (via image analysis) over residential area 330. Fisheye sensors 350 can be very expensive and may require significant resources to deploy and maintain, which affects scalability.

While cloud cover location and vector calculations may be accurate in locations within a line-of-site for fisheye sensor 350, cloud density measurements are typically inaccurate. Unlike ground-based sensors 250 (see FIG. 2), which can provide reasonably accurate measurements of sunlight, fisheye sensors 350 provide images. Some image analysis techniques may be used to analyze image properties (e.g., brightness of pixels), but the accuracy of such calculations and their correlation to an actual power output of an EG system can be poor. The many problems, estimations, and assumptions with fisheye sensor images required for density calculations are similar to those discussed with respect to FIG. 1 and would be appreciated by one of ordinary skill in the art.

An Embodiment

Figure 4:
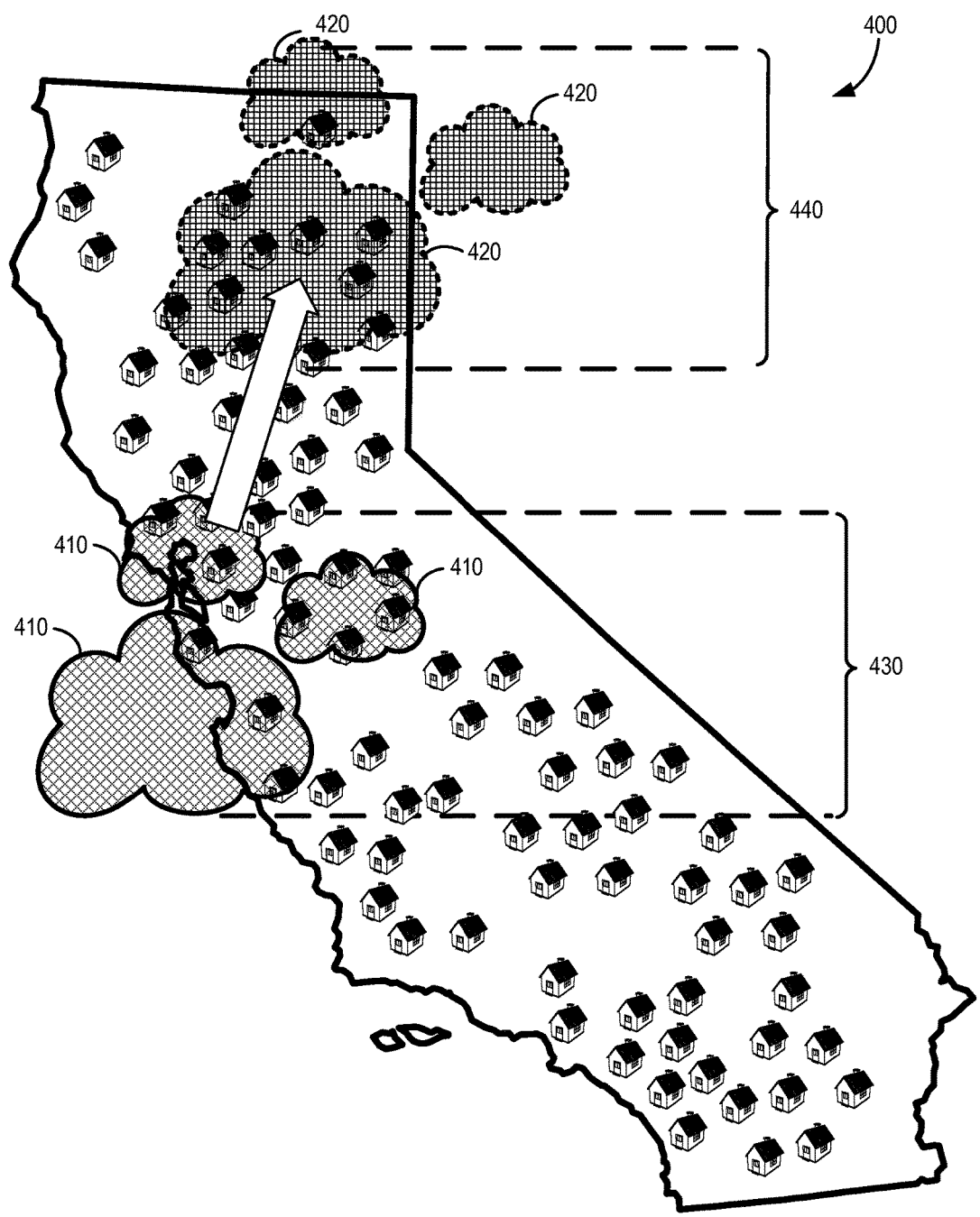
FIG. 4 shows aspects of a weather tracking system using aspects of one or more PV-based energy generation sites, according to certain embodiments.

FIG. 4 shows aspects of a weather tracking system 400 using aspects of one or more PV-based EG sites, according to certain embodiments. Weather tracking system 400 can be used to track and characterize a weather pattern 410 over a number of PV-based EG sites 430 and forecast its effects on downstream EG sites 440. A number of PV-based EG sites are shown in locations across the State of California, U.S.A. Each EG site depicted can represent 1 EG site, 10 EG sites, 1000 EG sites, or any suitable representation. Weather patterns 410, 420 can include one or more clouds (i.e., cloud cover) that can block an amount of sunlight from reaching certain EG sites.

Weather tracking system ("system") 400 has significant advantages over all conventional systems, including aspects of those shown in FIG. 1-3. System 400 utilizes the hardware and infrastructure in existing EG sites to perform the weather tracking operations. Thus, system 400 has virtually unlimited scalability with little to no additional cost for implementation of weather tracking capabilities. System 400 can be used to directly and accurately track a location, vector, and density of cloud cover over a number of EG sites and measure its precise effect on their corresponding power outputs. That is, system 400 directly measures weather effects on EG systems, while conventional systems indirectly correlate approximate effects, as discussed above. Furthermore, system 400 can forecast which downstream EG sites the cloud cover may affect, based on the cloud cover position, vector, and density measurements.

Certain undesirable inputs that can contribute to inaccurate power measurement readings can be eliminated in system 400. For instance, shade on PV panels, lower efficiency modules, or other site-specific effects can be decoupled from measurements by aggregating day-to-day historical EG data and removing the effects from power output calculations for more accurate measurements. Shade patterns usually predictably repeat around the same time every day. The effects of the shade can be decoupled from the cloud cover calculus that is further discussed below with respect to FIGS. 7-13. Historical power data, in general, can be used to filter out most causes of variation in power output, particularly when they are cyclic or occur during historically predictable times, as would be appreciated by one of ordinary skill in the art.

The embodiments described herein (e.g., systems 500-700) can also accommodate partial system failure. For instance, if some EG sites shut down or lose communication (i.e., no power measurement data is available), then adjacent EG sites can be used to compensate for the loss of data.

System 400 can also be combined with conventional systems (e.g., systems 100, 200, 300) for further accuracy. For example, with "ensemble forecasting," system 400 can be combined with satellite data from system 100 (see FIG. 1) to improve a forecast to determine which downstream EG sites may be affected by a weather system. Furthermore, system failure at certain EG sites can be compensated for by local adjacent systems. For example, if an EG site is down (e.g., lost communication with system 400), adjacent EG sites can be used to calculate a position, vector, and density of a weather system. Aspects of system 400 are further discussed below at least with respect to FIGS. 7-13.

An Exemplary Overall System Design

Figure 5:
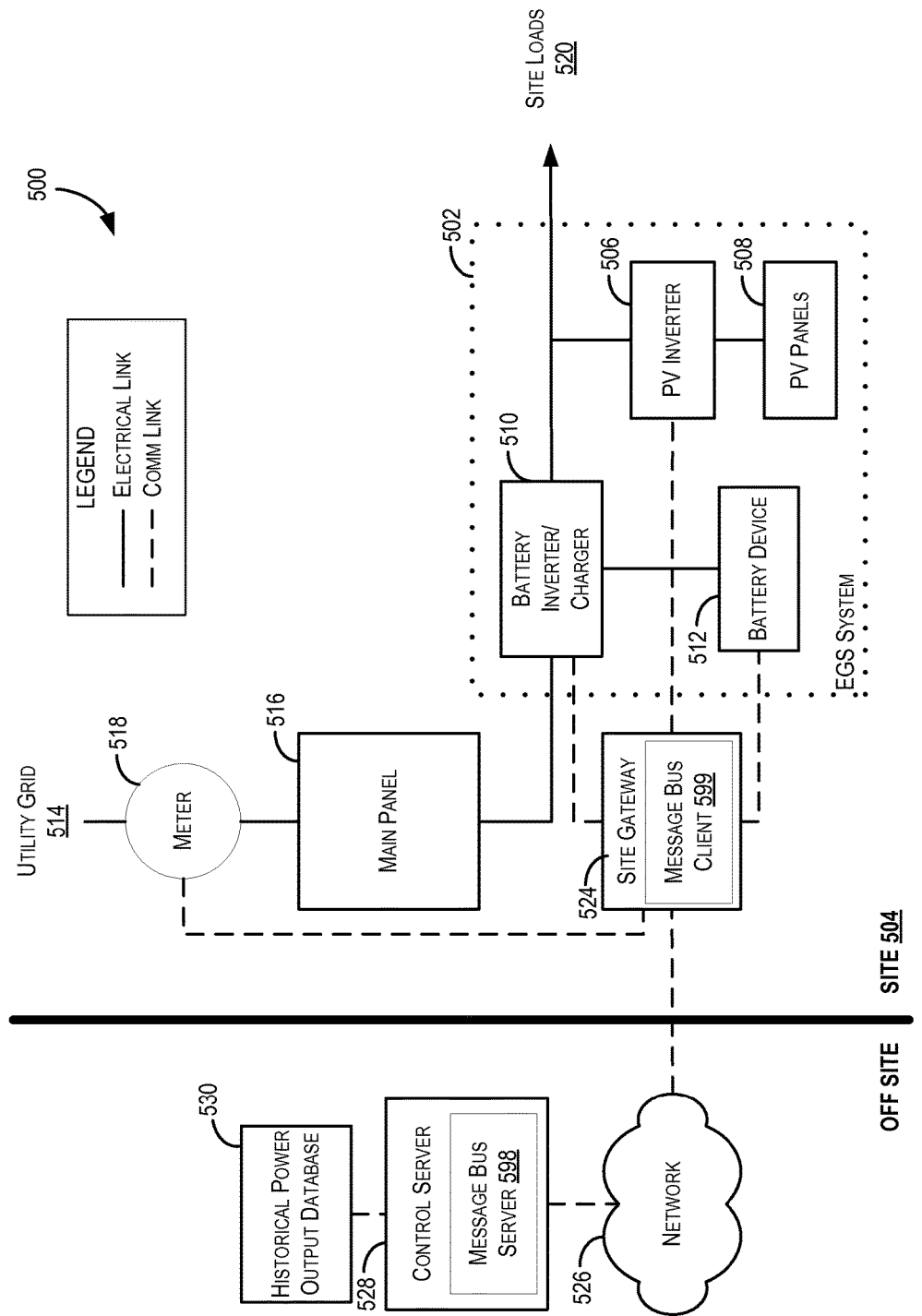
FIG. 5 shows a simplified block diagram of system environment for a single PV-based energy generation site, according to certain embodiments.

FIG. 5 shows a simplified block diagram of system environment 500 for a single PV-based energy generation site, according to certain embodiments. As shown, system environment 500 can include energy generation and storage (EGS) system 502 that is installed at site 504 (e.g., a residence, a commercial building, etc.). EGS system 502 includes a PV-based EG subsystem that can include PV inverter 506, one or more PV panels 508, and a battery-based EG subsystem comprising battery inverter/charger 510 and battery device 512. In some embodiments, PV inverter 506 and battery inverter/charger 510 can be combined into a single device. In the example of FIG. 5, EGS system 502 is grid-connected; thus, PV inverter 506 and battery inverter/charger 510 are electrically connected to utility grid 514 via main panel 516 and utility meter 518. Further, to provide power to site 504, utility grid 514, PV inverter 506, and battery inverter/charger 510 can be electrically connected to site loads 520.

Historical power output database ("HPOD") 530 can store historical power measurement data from one or more EG sites (e.g., EG site 504). The historical power measurement data can be up to date real-time data or non-real-time data. For instance, historical data can be power measurement data taken from one or more EG sites at an interval (e.g., every second, minute, hour, day, week, etc.). HPOD 530 may store power measurement data over a predetermined threshold of time. For instance, HPOD 530 may store historical power measurement data from one or more EG sites going back over a week, month, year, etc. In some embodiments, HPOD 530 may store aggregated historical power measurement data. HPOD 530 can be operated by a third party, operated (and part of) control server 528, or may be located at an individual EG site (e.g., site 504).

Integrated EGS systems, such as system 502, can provide advantages over EG systems that do not incorporate on-site energy storage. For example, excess energy produced by PV components 506 and 508 can be stored in battery device 512 via battery inverter/charger 510 as a critical reserve. Battery inverter/charger 510 can then discharge this reserved energy from battery device 512 when utility grid 514 is unavailable (e.g., during a grid blackout) to provide backup power for site loads 520 until grid power is restored. As another example, battery device 512 can be leveraged to "time shift" energy usage at site 504 in a way that provides economic value to the site owner or the installer/service provider of EGS system 502. For instance, battery inverter/charger 510 can charge battery device 512 with energy from utility grid 514 (and/or PV inverter 506) when grid energy cost is low. Battery inverter/charger 510 can then dispatch the stored energy at a later time to, e.g., offset site energy usage from utility grid 514 when PV energy production is low/grid energy cost is high, or sell back the energy to the utility when energy buyback prices are high (e.g., during peak demand times).

Centralized or remote management of an EGS system, such as system 502, can be advantageous for large scale EG networks for residential, commercial, or industrial markets. System 500, for example, can incorporate a centralized management system that includes site gateway 524 and control server 528. Site gateway 524 is a computing device (e.g., a general purpose personal computer, a dedicated device, etc.) that is installed at site 504. Gateway 524 may be a single gateway or a network of gateways and may be configured physically at the installation site or remotely, but in communication with site 504. As shown, site gateway 524 is communicatively coupled with on-site components 506, 510, 512, 518, and 540, as well as with control server 528 via network 526. In one embodiment, site gateway 524 can be a standalone device that is separate from EGS system 502. In other embodiments, site gateway 524 can be embedded or integrated into one or more components of system 502. Control server 528 is a server computer (or a cluster/farm of server computers) that is typically, but not necessarily, remote from site 504. Control server 528 may be operated by, e.g., the installer or service provider of EGS system 502, a utility company, or some other entity.

In one embodiment, site gateway 524 and control server 528 can carry out various tasks for monitoring the performance of EGS system 502. For example, site gateway 524 can collect system operating statistics, such as the amount of PV energy produced (via PV inverter 506), the energy flow to and from utility grid 514 (via utility meter 518), the amount of energy stored in battery device 512, and so on. Site gateway 524 can then send this data to control server 528 for long-term logging and system performance analysis.

Site gateway 524 and control server 528 can operate in tandem to actively facilitate the deployment and control of EGS system 502. Specifically, FIG. 5 shows other entities remote from the site "OFF SITE," which may communicate with EGS system 502. These other entities may include, as shown, web server 580 and database server 582. These entities are not discussed as their contribution to the operation of system 500 are not germane to the novel aspects discussed herein and would otherwise be understood by those of ordinary skill in the art.

According to embodiments, communication between the various elements involved in power management (e.g., between the centralized control server and the various devices at the remote site, and/or between centralized control server 528 and various other remote devices such as the database server, web server, etc.) may be achieved through use of a power management Message Bus System (MBS), such as that described in application Ser. No. 14/527,553, assigned to SolarCity Corporation, and incorporated herein by reference. In the simplified view of FIG. 5, the MBS is implemented utilizing message bus server 598, and message bus client 599 located at the site gateway. In FIG. 5, the message bus server is shown as being on control server 528, but this is not required and in some embodiments the message bus server could be on a separate machine and/or part of a separate server cluster.

The power management MBS as described herein, facilitates communication between the various entities (e.g., on-site devices, central control systems, distributed control systems, user interface systems, logging systems, third party systems etc.) in a distributed energy generation and/or storage deployment. In an aspect, the MBS operates according to a subscribe/publish model, with each respective device functioning as a subscriber and/or publisher, utilizing a topic of a message being communicated.

It should be appreciated that system environment 500 is illustrative and not intended to limit embodiments disclosed herein. For instance, although FIG. 5 shows control server 528 as being connected with a single EGS system at a single site, control server 528 can be simultaneously connected with a fleet of EGS systems that are distributed at multiple sites. In these embodiments, control server 528 can coordinate the scheduling of these various systems/sites to meet specific goals or objectives. In further embodiments, the various components depicted in system 500 can have other capabilities or include other subcomponents that are not specifically described. Furthermore, multiple instances and variants of the control server may exist, each communicating with one or more other control servers, EGS systems and/or other devices connected to the MBS. Alternatively, other methods of communication (e.g., point-to-point) other than MBS-based systems can be used, and one of ordinary skill in the art will recognize the many variations, modifications, and alternatives in methods of communication to implement system 500.

Figure 6:
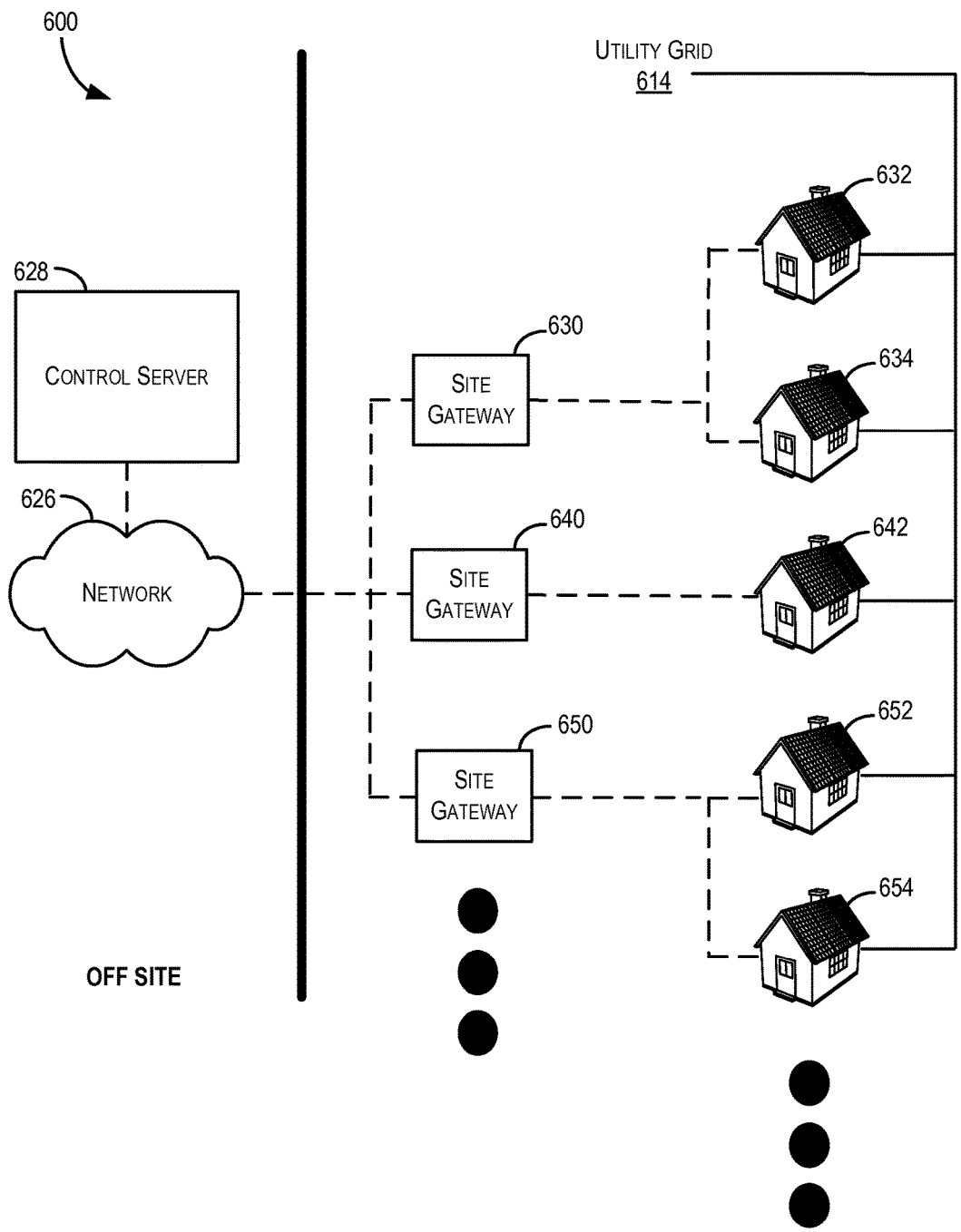
FIG. 6 shows a simplified block diagram of multi-system environment for multiple PV-based energy generation sites, according to certain embodiments.

FIG. 6 shows a simplified block diagram of multi-system environment 600 for multiple PV-based energy generation sites, according to certain embodiments. Control server 628 can be communicatively coupled to site gateways 630, 640, 650. Site gateway 630 can be communicatively coupled to EG sites 632, 634. Site gateway 640 can be communicatively coupled to EG site 642. Site gateway 650 can be communicatively coupled to EG sites 652, 654. Any number of site gateways and EG sites can be included in multi-system environment 600. In certain embodiments, an EG site can be similar to system 500 of FIG. 5. One or more of the EG sites can be coupled to utility grid 614. Control server 628 may be a single control server or multiple communicatively-coupled control servers. Network 626 can be a single network (e.g., world wide web) or a collection of smaller networks. The hierarchical and operational relationship between control server 628 and EG sites (632-654) can be any suitable configuration provided that, in preferred embodiments, data from each EG site (e.g., power measurement data), or a subset thereof, are accessible by control server 628. Two non-limiting examples are described in Application 62/163,200 and Ser. No. 14/802,811, the contents of which are herein incorporated by reference in their entirety for all purposes.

EG sites may provide power measurement data, historical power data (further discussed below with respect to FIG. 7), load data (e.g., types of loads, etc.), and more. Power measurement data (and historical power data) can be used to determine the presence of cloud cover over a corresponding EG site, as well as its vector and density. The presence, vector, and density data can be used to forecast where the cloud cover is headed and provide an estimation of its effect on a power output for downstream EG sites. Downstream can mean EG sites that are in the calculated vector path of the detected cloud cover.

For the purpose of illustration, each EG site can be likened to a pixel, where additional EG sites can provide a greater resolution for a "snapshot" of cloud cover over a given area. For instance, a geographic area having thousands of EG sites can produce a more detailed "snapshot" of the presence, vector, and density of cloud cover over that area as compared to the same area having only a few EG sites. Thus, as multi-system environment 600 increases its number of EG sites, more data becomes available and a more accurate assessment can be possible.

Calculating a Presence and Density of Cloud Cover

In some embodiments, determining the presence and density of cloud cover can depend on a relationship between a present power output for an EG site and its historical power output. Historical power data can provide a snap shot of what a power output should typically be during clear sky conditions (assuming normal climate conditions). If an EG site typically produces 5 kW at a certain time of the day (based on historical data) and currently produces 2.5 kW, than the solar panels for the EG site are probably obscured by cloud cover. The magnitude of that reduction in power can be used to determine the density of the cloud cover. As further addressed below, variations due to shade, daylight savings, or other events or conditions that may predictably occur can be filtered out of the cloud cover calculations.

Figure 7:
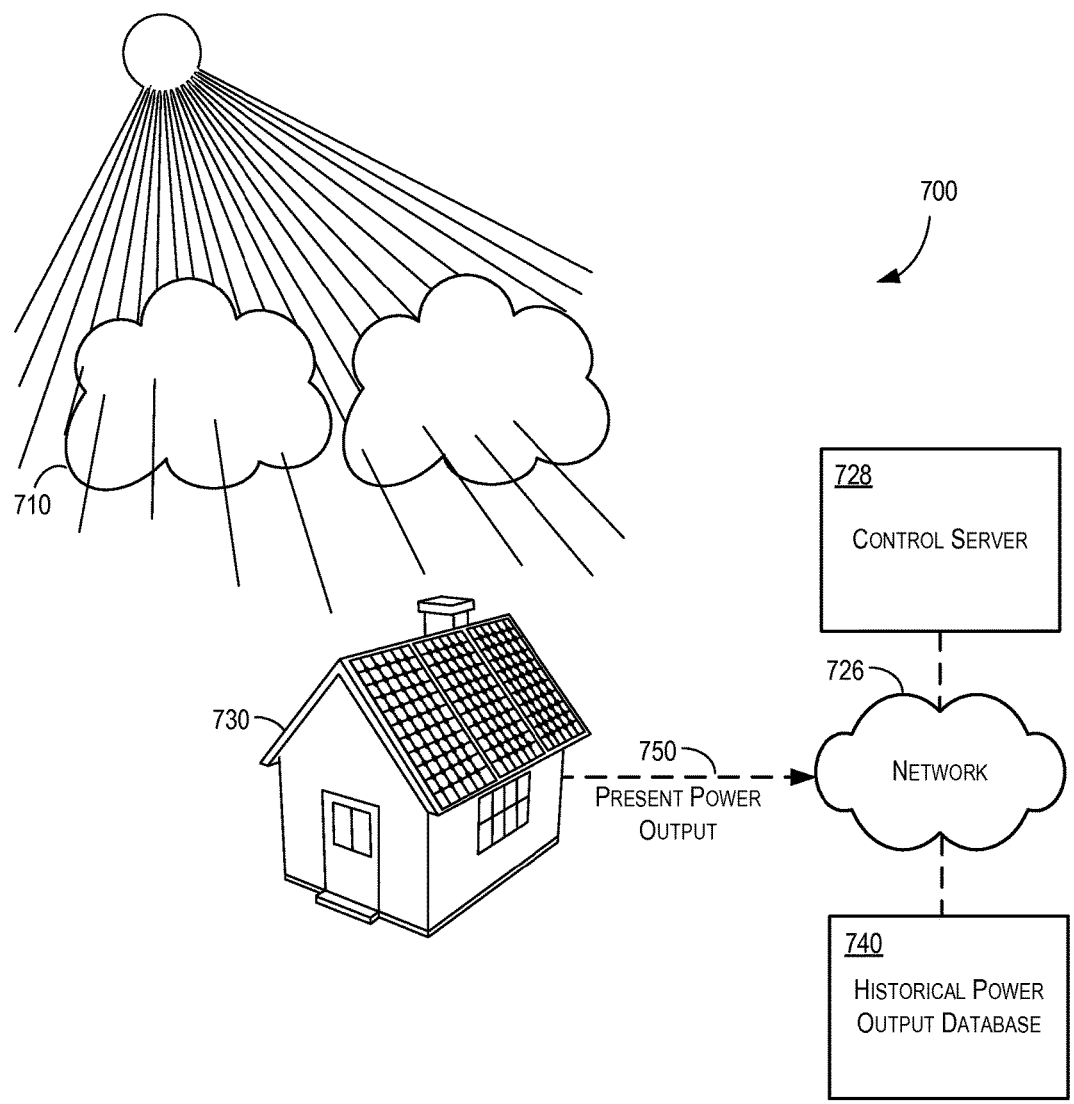
FIG. 7 shows aspects of determining a presence and density of cloud cover over an energy generation system, according to certain embodiments.

FIG. 7 shows aspects of determining a presence and density of cloud cover over an energy generation system 700, according to certain embodiments. EG system 700 includes EG site 730 communicatively coupled to control server 728 and historical power output database ("HPOD") 740 through network 726. EG system 730 can provide power measurement data to control server 728. In some embodiments, power measurement data may include present power output data 750. HPOD 740 can provide historical power output data. Historical power output data may also be stored in a local database at site 730, which may be a separate entity, or may include memory resources associated with any of the devices at site 730 (e.g., a gateway, inverter, etc.), a local computing device, or at control server 728. EG system 700 may operate similarly to system 500 of FIG. 5 and/or system 600 of FIG. 6.

A presence of cloud cover over EG site 730 can be determined by comparing a present power output to a historical power output, calculating a difference value, and comparing it to a predetermined threshold value. The predetermined threshold value can be any suitable difference value that would likely be indicative of cloud cover. Dense storm clouds would likely reduce a present output power at an EG site more than, for example, thin and wispy cirrus clouds. The predetermined threshold value may be selected to only include very dense clouds (e.g., storm clouds) that could substantially affect a power output at a present EG site or those downstream. For example, the predetermined threshold value may be set to 50% such that a presence of storm clouds are detected when the present power output is half of a historical average power output for the corresponding EG site. Other threshold values may be used (e.g., 30%, 40%, 60%, 70%, 80%, etc.). Alternatively, the predetermined threshold value may be a value unrelated to a particular historical power output. For instance, the predetermine threshold value may be set to indicate cloud cover when the detected value is at 60% of the expected, historical value for all EG sites over a geographic area, regardless of the power output of each individual EG site.

A density of cloud cover over EG site 730 can be determined by comparing a present power output to a historical power output and calculating a percentage difference value. For instance, if a present power output is 50% of a historical power output (e.g., aggregate historical power output over the last month), then a density of cloud cover can be measured at 50%. Any suitable rating method can be used (e.g., density having a scale of 0-1, etc.).

Load characteristics can be controlled at EG site 730 based on the detected presence and/or the calculated density of the cloud cover. For example, an energy storage device at EG site 730 (not shown) may be charged to a different set point in anticipation of a strong thunderstorm with a high probability of a blackout on the utility grid. In some implementations, load characteristics for downstream EG sites can be controlled, as further discussed below at least with respect to FIGS. 8-10.

Control server 728 can receive power measurement data including present power output data from EG site 730 and historical power output data from HPOD 740. In some embodiments, the historical power output data is aggregated over a period of time (e.g., 1 week, 1 month). Historical power output data can include an aggregated value for a same period of time a year ago, a month ago, or over several years or months.

Calculating a Vector for Cloud Cover

Tracking a vector (i.e., speed and direction) of a weather pattern can be useful for forecasting which downstream EG sites will be affected by the weather pattern. There are several ways to measure a vector using embodiments. A first vector calculation involves measuring a density of cloud cover and determining a vector based on the detection and movement of the density measurement (see FIG. 8). A second method includes tracking a weather pattern (e.g., cloud cover) with respect to a bounded area defined by one or more PV-based EG sites and determining a vector based on a movement of the weather pattern within the bounded area (see FIG. 9).

Figure 8:
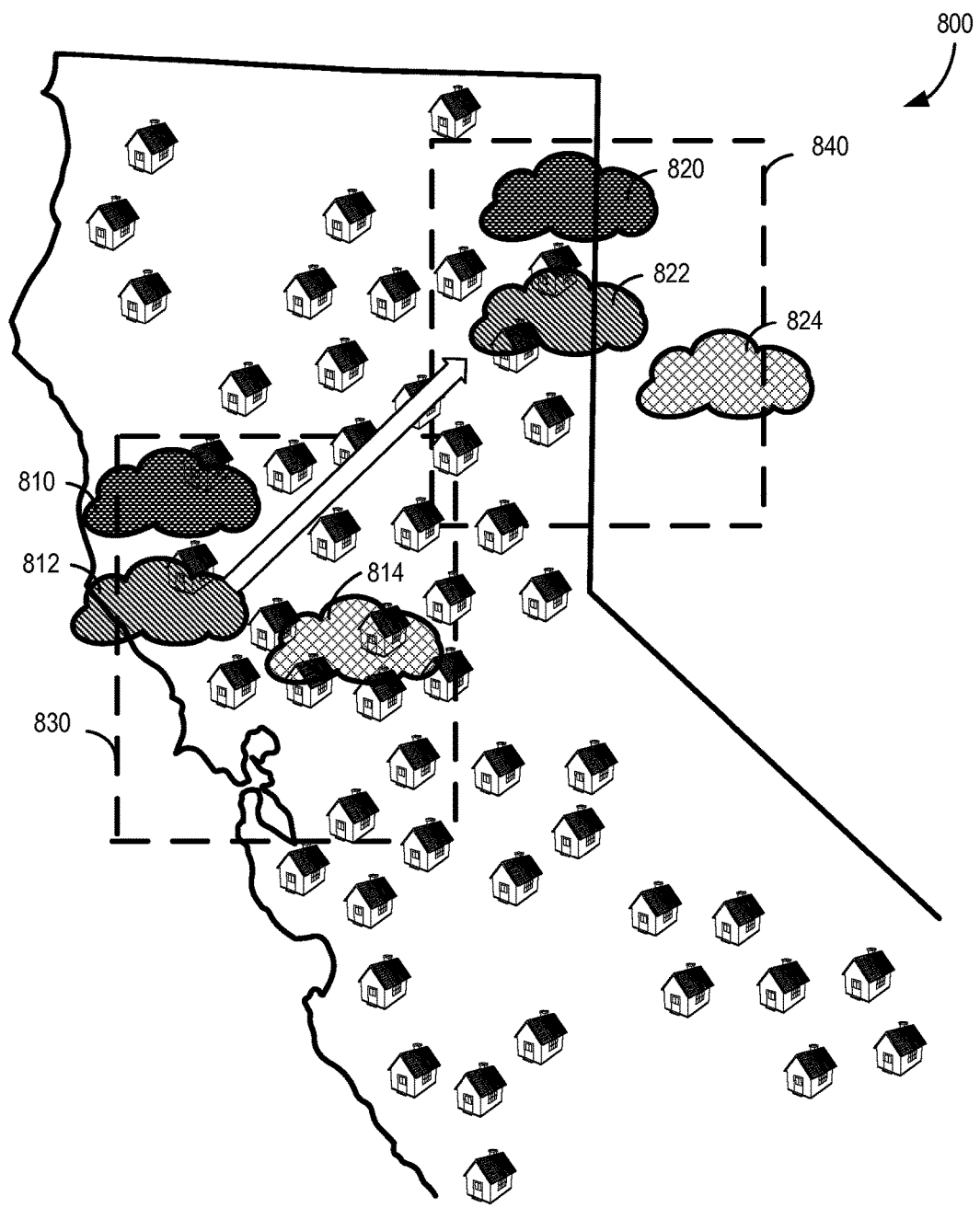
FIG. 8 shows aspects of a system for determining a vector of a weather pattern, according to certain embodiments.

FIG. 8 shows aspects of a system 800 for determining a vector of a weather pattern, according to certain embodiments. A number of PV-based EG sites are shown in locations across the State of California, U.S.A. Each EG site depicted can represent 1 EG site, 10 EG sites, 1000 EG sites, etc., as similarly shown and described with respect to FIG. 4. Clouds 810, 812, and 814 are shown over a portion of PV-based EG sites 830. Cloud 814 has a low density, cloud 812 has a medium density, and cloud 814 has a high density. A single cloud may represent one or more clouds and/or portions of one or more weather patterns. The EG sites may be grid-connected and controlled by a remove server, similar to the systems described in FIGS. 5-7.

Figure 9:
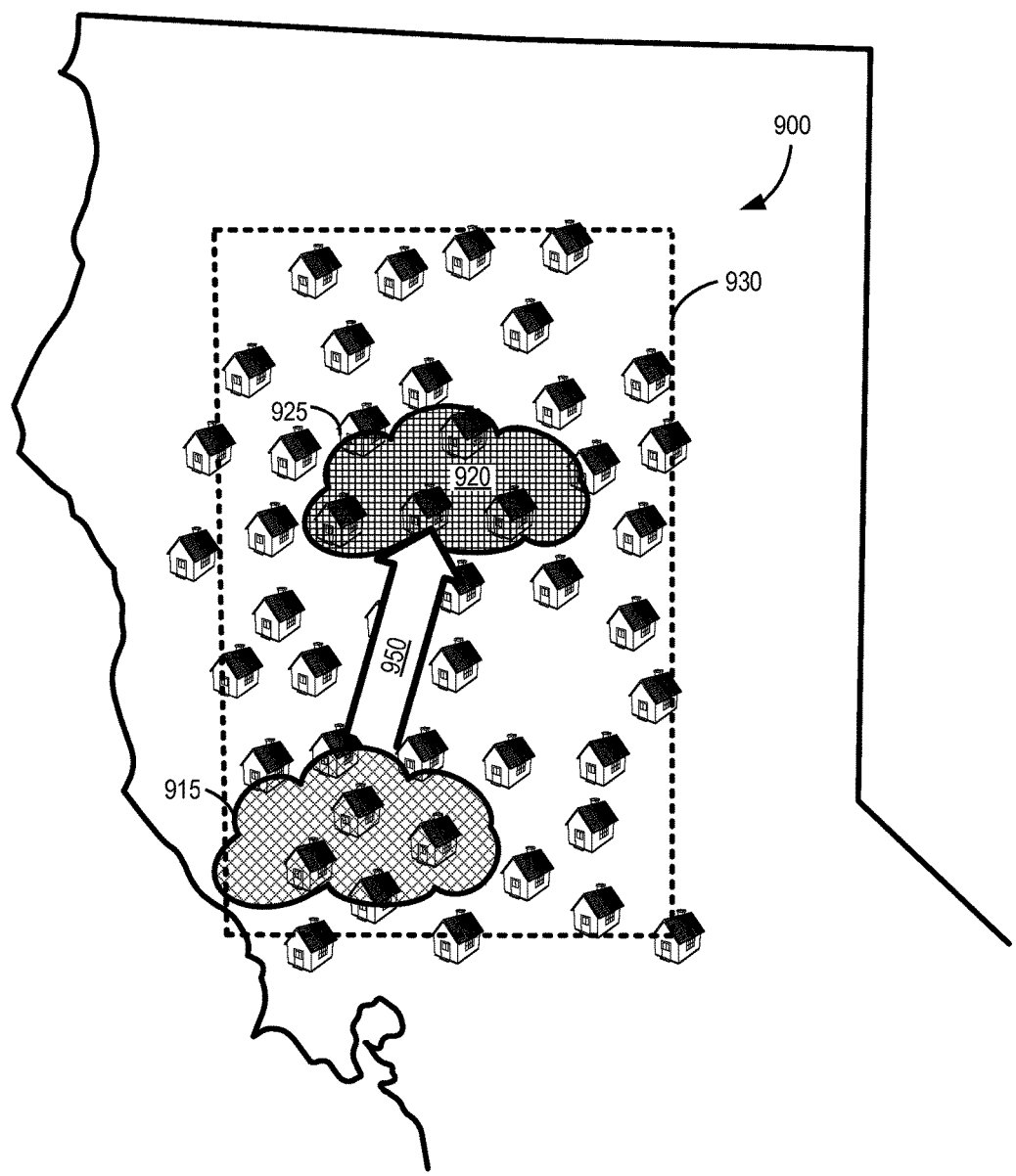
FIG. 9 shows aspects of a system for determining a vector of a weather pattern, according to certain embodiments

A vector of a weather pattern (e.g., cloud cover) can be determined by calculating a density of a cloud cover over a first EG site and determining that a similar density exists at a second EG site after a period of time. The second EG site may have a density that is "similar" to the first EG site if it is within a certain threshold tolerance value (e.g., within 2.5%). The period of time may be seconds, minutes, hours, or other suitable period of time. A vector for the weather pattern can be calculated based on the relative locations of the first and second EG sites, the distance between the two EG sites, and the amount of time it took for the cloud cover having the density measured at the first EG site to arrive at the second EG site. Once the vector is determined, a forecast of where the weather system is located, and what effect it will have on downstream systems (due to cloud density) can be estimated. Referring to FIG. 8, a weather tracking system (e.g., systems 500, 600, 700) may determine that the densities of clouds 810, 820, 830 are within the threshold tolerance value of clouds 820, 822, and 824, respectively. FIG. 8 is not necessarily drawn to scale and some vector calculations can be based on EG sites located within a relatively close proximity (e.g., 1 mile, 5 miles, etc.). In an aspect, multiple different measurements may be used FIG. 9 shows aspects of system 900 for determining a vector of a weather pattern, according to certain embodiments. In this example, a plurality of PV-based EG sites are shown in locations across a section of the State of California. The EG sites can detect the presence of cloud cover based on their corresponding present power outputs and historical power outputs discussed above with respect to FIG. 7. Boundary 930 represents a cloud detection area defined by a location of the plurality of EG sites. Cloud cover 910, which includes edge 915 and covers an area spanning multiple EG sites, is shown moving to a location shown as cloud cover 920.

As cloud cover 910 moves within boundary 930, system 900 detects at least a portion of edge 915 and calculates vector 950 based on the movement of edge 915 with respect to boundary 930. Once vector 950 is known, system 900 can determine what EG sites downstream may be affected by cloud cover 910. For instance, EG sites located within edge 925 are downstream and within vector path 950 of cloud cover 910. Thus, system 900 may proactively control aspects of downstream EG sites (e.g., EG distribution profile) to better accommodate potential negative effects of cloud cover 910, including undesirable changes in power flow across the grid (e.g., utility grid black outs, brown outs, and the like).

Some clouds may be easier to detect than others. Large, black storm clouds with associated EG site power drops of over 50-70% are a strong indicator that a weather pattern is present, trackable, and obscuring the corresponding PV panels. Weather formations having big, dark clouds casting shadows and hard edges (i.e., the boundary of the weather system) are easier to detect (e.g., for vector measurements) than intermittent low-density cloud cover (e.g., cirrus clouds). That is because hard edges may produce a fast step function (e.g., a first row of EG sites with greatly reduced power output and an adjacent second row of EG sites having power outputs close to a historical average). Likewise, intermittent weather patterns with soft edges may be more difficult to reliably detect, particularly in edge detection for determining a vector. However, proactive energy generation distribution (see, e.g., FIG. 13) would likely not occur in response to weather conditions causing little to no appreciable power output reduction.

Ensemble forecasting, as discussed above, may incorporate other resources to help determine aspects of weather patterns. In some alternative embodiments, temperature data (e.g., outside temperature) from a plurality of EG sites may allow systems (e.g., systems 500-700) to not only track cloud fronts, but also air movement at various temperatures (i.e., cold fronts and warm fronts). Data describing the movement of cold and warm fronts can be used as an alternative method of determining a weather pattern (cloud cover) vector. Knowing the location and movement of warm and cold fronts may inform a resultant heating/cooling load for individual EG sites to prompt preliminary action, as further discussed below at least with respect to FIG. 13.

Figure 10:
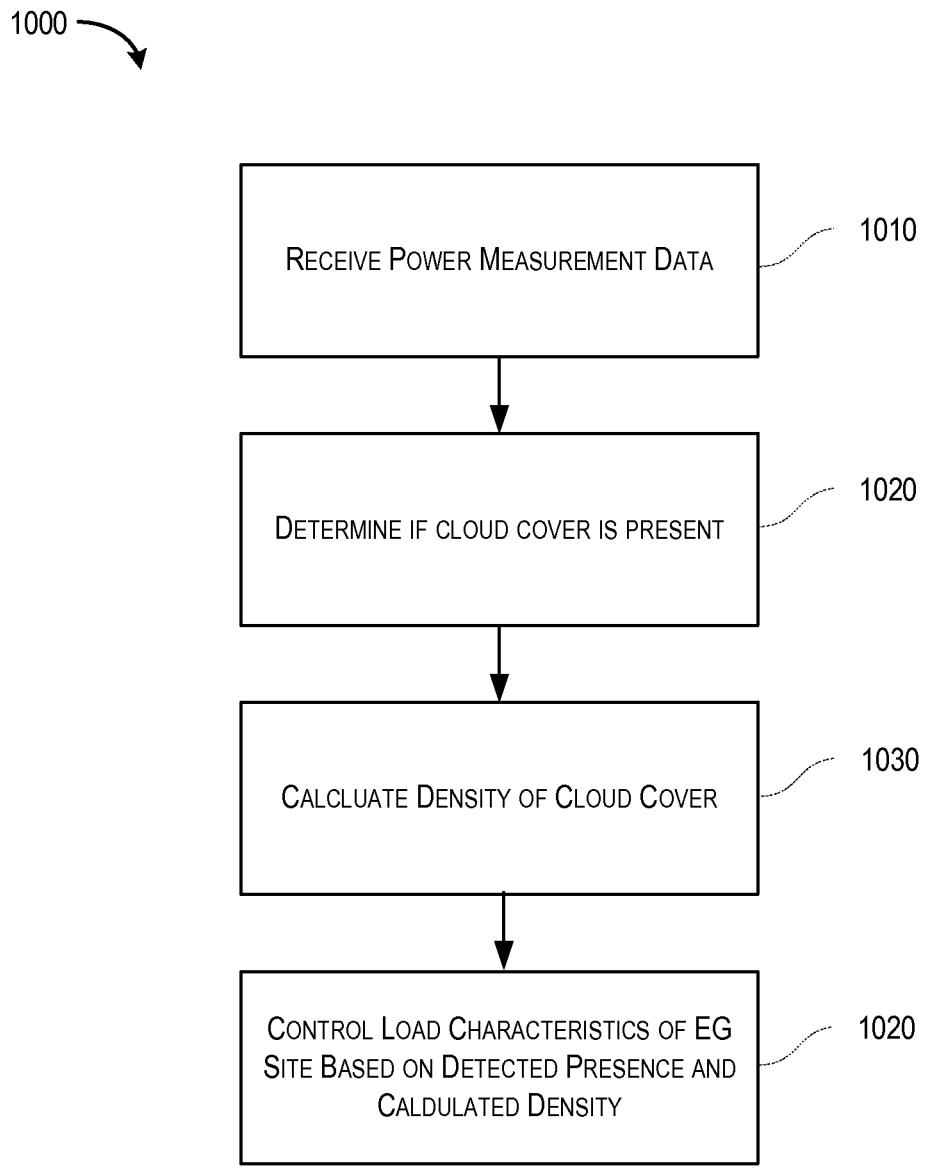
FIG. 10 shows a simplified flow chart for a method of tracking weather patterns in a grid-connected array of PV-based EG sites, according to certain embodiments.

FIG. 10 shows a simplified flow chart for a method of tracking weather patterns (cloud cover) in a grid-connected array of PV-based EG sites, according to certain embodiments. The following methods 1000, 1100 (see FIG. 11), and 1200 (see FIG. 12) can be performed by processing logic that may comprise hardware (circuitry, dedicated logic, etc.), software (such as is run on a general purpose computing system or a dedicated machine), firmware (embedded software), or any combination thereof. In certain embodiments, method 1000 can be performed by a processor on control server 528, site gateway 524, or other suitable computing device or system described herein.

At step 1010, method 1000 includes receiving power measurement data for a PV-based EG site. The power measurement data may include a present power output of the EG site and a historical power output of the EG site. The present power output of the EG site may be received from the EG site. For instance, the present power output may be provided to a control server by a gateway, a PV inverter, or other on-site computing device local to the EG site (e.g., see system 500 of FIG. 5).

Power measurement data corresponding to the historical power output of the EG site can be received from a database. The database can be a operated by a third-party entity (e.g., historical power output database 530), the database can by operated and/or controlled by the control server (e.g., control server 528), or it may be local to and operated by the EG site. In some embodiments, the historical power output is an average power output for the EG site for a previous predetermined period of time, which may be any suitable time span (e.g., previous week, month, year, or other continuous or non-continuous period of time), as would be appreciated by one of ordinary skill in the art with the benefit of this disclosure.

At step 1020, method 1000 includes determining if cloud cover is present over the EG site based on the present and historical power outputs for the EG site. The determining may include calculating a difference between the present power output and the historical power output for the EG site. Historical power output may be selected based on power generation at the same or similar time of day for previous days, previous months, or previous years. The record of historical power generation may be filtered or modified using a function such as a mean, median, mode, or percentile. Historical power generation at certain times may be computed using a model solar position, EG system geometry (e.g. tilt and orientation of solar panels) and ratings (solar panel efficiency, inverter efficiency), and possibly historical power generation at other times. The cloud cover may be determined to be present over the EG site if the difference between the present power output and historical power output of the EG site is greater than a predetermined threshold value for cloud cover. Alternatively, cloud cover may be determined to be present based on a quotient (percentage) of the present power output versus the historical power output (e.g., present power output is less than 50% of historical average).

At step 1030, method 1000 includes calculating a density of the cloud cover over the EG site based on the present and historical power outputs for the EG site. The density can be based on a percentage difference in power output between the present power output and the historical power output. In some embodiments, the percentage difference between the present and historical power outputs for the EG site can be used to both determine the presence of cloud cover and calculate its density.

At step 1040, method 1000 includes controlling load characteristics of the EG site based on the determined presence and calculated density of the cloud cover. In some embodiments, the controlled load characteristics of the EG site may include at least one of a charging profile for an energy storage device associated with the EG site or a time-shifting load profile of the EG site. For instance, an HVAC system associated with the EG site (e.g., site load 520) may be regularly scheduled to turn on at 5 P.M. to achieve a desired temperature before a homeowner arrives at 6 P.M. One example of time-shifting a load would be to turn on the HVAC at 2 P.M. in anticipation of a thunderstorm (or other event) that may result in less energy generation being available at the regularly scheduled time of operation. In some embodiments, a charging profile for the energy storage device may include an increased charge set point when cloud cover is determined to be present (or approaching) and the cloud cover density is greater than a predetermined threshold value for cloud density.

In certain embodiments, ensemble configurations may be used. An ensemble configuration can include the combination of different technologies to achieve an improved forecasting accuracy. For instance, some embodiments may combine aspects of method 1000 with the satellite data analysis described with respect to FIG. 1 to determine a vector for cloud cover. To illustrate this concept, method 1000 may include receiving weather forecast data, determining a vector of the determined cloud cover based on weather forecast data, determining one or more EG sites in path of cloud cover based on determined vector, and controlling load characteristics of the one or more EG sites in the path of the cloud cover can be based on the determined presence and calculated density of the cloud cover over the EG site. Any combination of technologies is possible (e.g., method 1000 and one or more of aspects shown in FIGS. 1-3). Further aspects of method 1000 are discussed at least with respect to FIG. 7.

It should be appreciated that the specific steps illustrated in FIG. 10 provide a particular method 1000 of measuring a power signal in a power grid, according to certain embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1000.

Figure 11:
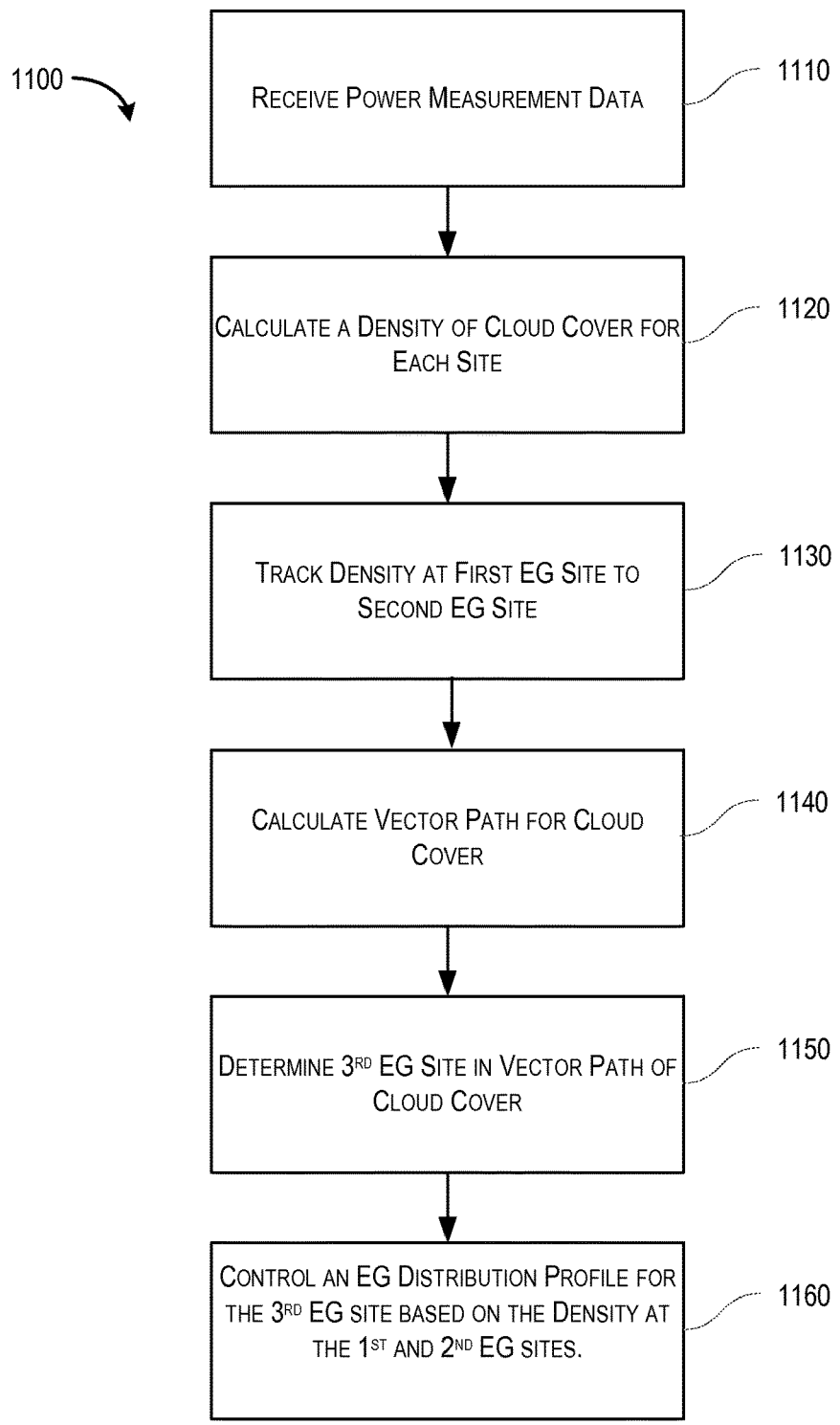
FIG. 11 shows a simplified flow chart for a method of tracking weather patterns in a grid-connected array of PV-based EG sites, according to certain embodiments.

FIG. 11 shows a simplified flow chart for a method of tracking weather patterns (cloud cover) in a grid-connected array of PV-based EG sites, according to certain embodiments. In certain embodiments, method 1100 can be performed by one or more processors on control server 528, site gateway 524, or other suitable computing device or system described herein.

At step 1110, method 1100 includes receiving, by a processor, power measurement data for a plurality of PV-based EG sites. The power measurement data may include a present power output for each of the EG sites (or subset thereof) and a historical power output for each of the EG sites (or subset thereof). The present power output of the EG site may be received from the EG site. For instance, the present power output may be provided to a control server by a gateway, a PV inverter, or other on-site computing device local to the EG site (e.g., see system 500 of FIG. 5).

Power measurement data corresponding to the historical power output of the EG site can be received from a database. The database can be a operated by a third-party entity (e.g., historical power output database 530), the database can by operated and/or controlled by the control server (e.g., control server 528), or it may be local to and operated by the EG site. In some embodiments, the historical power output is an average power output for the EG site for a previous predetermined period of time, which may be any suitable time span (e.g., previous week, month, year, or other continuous or non-continuous period of time), as would be appreciated by one of ordinary skill in the art with the benefit of this disclosure.

At step 1120, method 1100 includes calculating, by the processor, a density of cloud cover over each EG site (or subset thereof) based on a percentage difference between a present power output and historical power output for the corresponding EG site. At step 1130, method 1100 includes determining, by the processor, that a density of cloud cover at a first EG site of the plurality of EG sites exists at a second EG site of the plurality of EG sites after a period of time. The basic concept is that a certain cloud density is measured at a first EG site location. If that cloud density is measured at another EG site location after a certain period of time, then the assumption is that that cloud cover at the first EG site has moved to the second EG site. In some cases, multiple EG sites spanning a certain geographic area may measure different cloud densities resulting in an overall pattern of densities for that geographic area. Thus, patterns of cloud densities can be tracked. In some cases, aspects of cloud cover may change over time (e.g., shape, density), so a threshold may be used to identify approximately "equal" densities. For instance, the cloud cover density at the first EG site may be deemed "equal" to the cloud density at the second EG site if the density calculations are within 5% of each other (or other suitable value). The period of time can be any suitable stretch of time spanning seconds, minutes, hours, etc. Because clouds may change dramatically over longer periods of time, shorter periods of time may be preferred (e.g., seconds, minutes).

Once two EG sites having similar cloud cover densities are determined, their locations can be used to calculate a corresponding vector including direction and speed (the time it took the cloud from EG site 1 to reach EG site 2). Thus, at step 1140, method 1100 includes calculating, by the processor, a vector path for the cloud cover based on a location of the first EG site, a location of the second EG site, and the period of time. Utilizing pattern densities (e.g., multiple cloud density measurements made by adjacent EG sites) can, in some cases, provide a more accurate vector measurement. As discussed above, individual clouds may change shape and density over time at different rates. By tracking a pattern of densities, some of these changes may be computationally mitigated because any change in a single cloud may be offset by, for example, an average of the density pattern and its corresponding movement.

At step 1150, method 1100 includes determining, by the processor, a third EG site of the plurality of EG sites having a location in the vector path of the cloud cover. That is, by using the calculated vector (i.e., speed and vector of the corresponding cloud cover), other EG sites downstream from the first and second EG sites can be determined. Some closer EG sites may be affected by the cloud cover (e.g., reduced power output due to cloud cover) in a shorter period of time based on the speed component of the vector. In contrast, farther EG sites may be affected later.

Weather can be unpredictable and air speed and direction can change quickly. Thus, forecasts predicting downstream EG sites that are relatively close (e.g., 1-5 miles) may be more accurate than forecasts predicting downstream EG sites farther away (e.g., 10-50 miles). Thus, more sophisticated algorithms can be used (possibly in an ensemble arrangement) to modify that calculated vector at longer distances. For example, the calculated vector may apply as is for more local downstream forecasting. In contrast, the calculated vector may be modified to identify EG sites within an expanding range relative to the vector. For example, method 1100 may include EG sites (e.g., 10 or more miles away) within a +/−20 degree divergence from the calculated vector path of the cloud cover. Other modifications and possible as would be appreciated by one of ordinary skill in the art.

At step 1160, method 1100 includes controlling, by the processor, an EG distribution profile for the third EG site based on the density of cloud cover at the first EG site or second EG site. The EG distribution profile may relate to a charging profile for an energy storage device associated with the third EG site. In some embodiments, the EG distribution profile of the EG site may include time-shifting load profile of the EG site. In some embodiments, a charging profile for the energy storage device may include an increased charge set point when cloud cover is determined to be present and the cloud cover density is greater than a predetermined threshold value for cloud density. Further aspects of method 1100 are discussed at least with respect to FIG. 8.

It should be appreciated that the specific steps illustrated in FIG. 11 provide a particular method 1100 of measuring a power signal in a power grid, according to certain embodiments. Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

Figure 12:
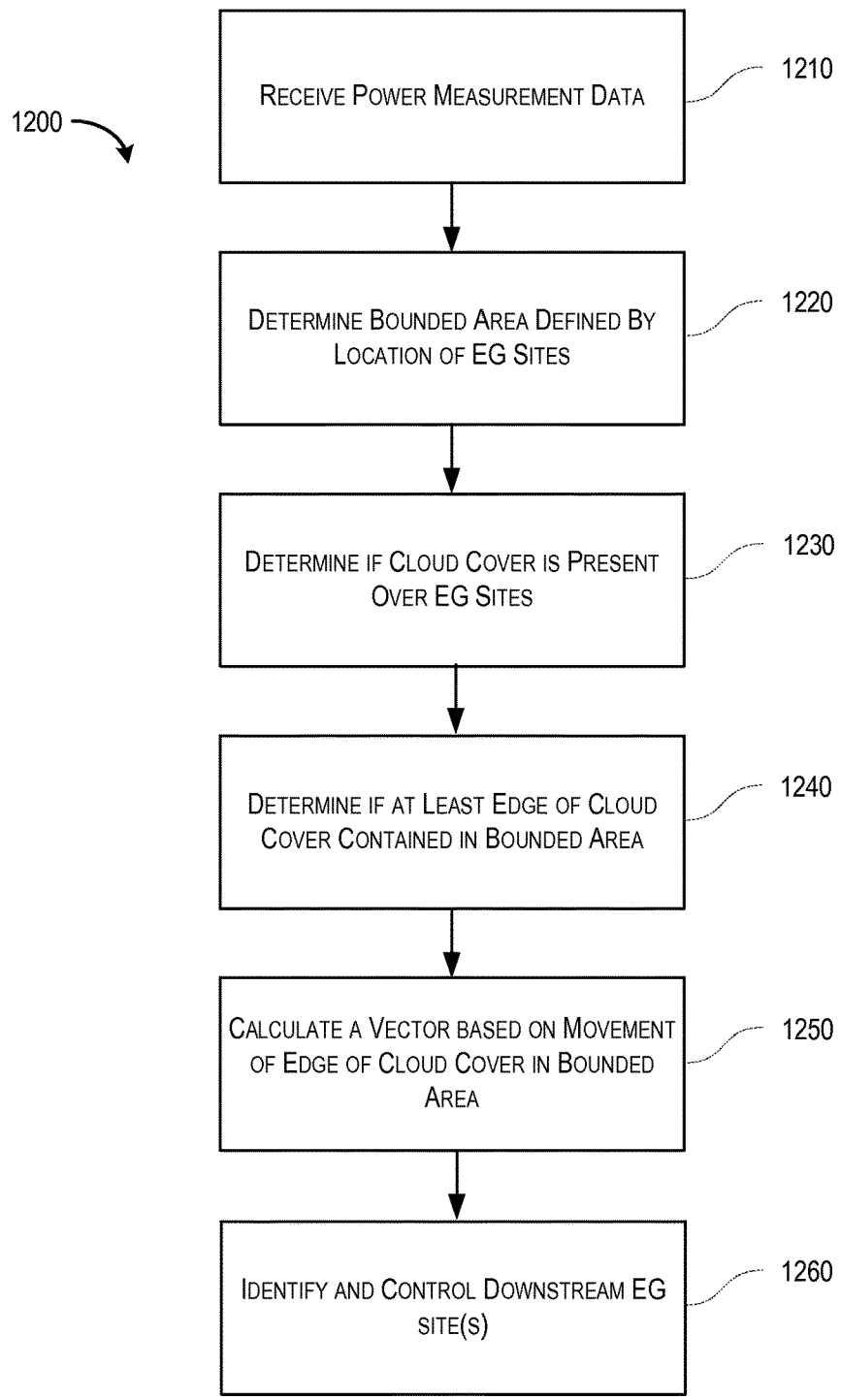
FIG. 12 shows a simplified flow chart for a method of tracking weather patterns in a grid-connected array of PV-based EG sites, according to certain embodiments.

FIG. 12 shows a simplified flow chart for a method of tracking weather patterns (cloud cover) in a grid-connected array of PV-based EG sites, according to certain embodiments. In certain embodiment, method 1200 can be performed by a processor on control server 528, site gateway 524, or other suitable computing device or system described herein. Aspects of FIG. 12 are further described above at least with respect to FIG. 9.

At step 1210, method 1200 includes receiving power measurement data for a plurality of PV-based EG sites. Each EG site can have a corresponding location. The power measurement data can include a present power output of each of the plurality of EG sites (or subset thereof), and a historical power output of each of the plurality of EG sites (or subset thereof).

At step 1220, method 1200 includes determining a bounded area defined by the locations of the plurality of EG sites. For example, a bounded area can be defined by the outer-most locations of a plurality of EG sites, which define an area of measurement coverage (i.e., an area where weather pattern analysis can be made using EG-site resources). The "resolution" of the area of measurement coverage is based on the number and distribution of EG-sites within the bounded area. Thus, a 100 square kilometer area having 50,000 PV-based EG units may provide more data (i.e., better accuracy/resolution) than that same area having 50 EG units.

At step 1230, method 1200 includes determining if cloud cover is present over each of the plurality of EG sites (or subset thereof) based on their corresponding present power outputs and historical power outputs. One purpose for this step is to identify which EG sites register cloud cover. Each EG site detecting cloud cover can be used as a "pixel" to determine how cloud cover is distributed throughout the bounded area. If a weather pattern (e.g., cloud cover over a large area) is completely contained within the bounded area, then a vector (i.e., movement and speed) of the weather pattern can easily be tracked by using some or all of the EG sites within the bounded area by, for example, tracking the edges of the weather pattern and determining its vector based on the detected movement of the edges. The resolution of the tracked location of the weather pattern may be dictated by the number and distribution of PV-based EG sites within the bounded area. In some embodiments, a portion of the entire edge defining the area of cloud cover can be used to calculate its vector. For instance, if a weather pattern having widespread cloud cover is much larger than the bounded area, but at least an edge of the weather pattern is contained within the bounded area, then certain features of the edge (e.g., characteristics of its shape or density) can be tracked as it moves through the bounded area. For sufficiently large EG sites (e.g., solar farms), individual panel measurements, string measurements, subsets of panels from the whole, etc., may be used to detect and/or track clouds and cloud movement using the methods described above.

Thus, at step 1240, method 1200 includes determining if at least an edge of the cloud cover is detectable from a plurality of EG site data. At step 1250, a vector is calculated based on a movement of the edge of the storm system within the bounded area. At step 1260, method 1200 includes identifying a downstream EG site in the vector path of the storm system, as further discussed above at least with respect to FIGS. 8-11. Step 1260 further includes controlling an EG distribution profile for the downstream EG site based power characteristics of the EG sites of the plurality of EG sites within the storm system.

Some embodiments may include calculating a density of cloud cover over each EG site within the weather pattern (e.g., cloud cover, storm system, etc.) based on a percentage difference between a present power output and historical power output for the corresponding EG site. In some implementations, controlling the EG distribution profile for the downstream EG site can be further based on the density of cloud cover over each EG site within the weather pattern.

It should be appreciated that the specific steps illustrated in FIG. 12 provide a particular method 1200 of measuring a power signal in a power grid, according to certain embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1200.

Aspects of Energy Distribution

Many of the embodiments discussed herein relate to forecasting which downstream EG sites may be affected by the weather pattern based on a calculated vector and corresponding density, and controlling aspects of energy generation distribution for the downstream EG sites to take advantage of the early warning and knowledge that their respective power outputs may be severely reduced or shutdown entirely by the approaching weather system. In some implementations, energy storage devices may be charged to higher set points, appliances and/or HVAC systems may operate at earlier times to take advantage of energy stores while they are available, and other preliminary measures are possible as would be appreciated by one of ordinary skill in the art. Some of the myriad ways of controlling and distributing energy generation are discussed here.

Figure 13:
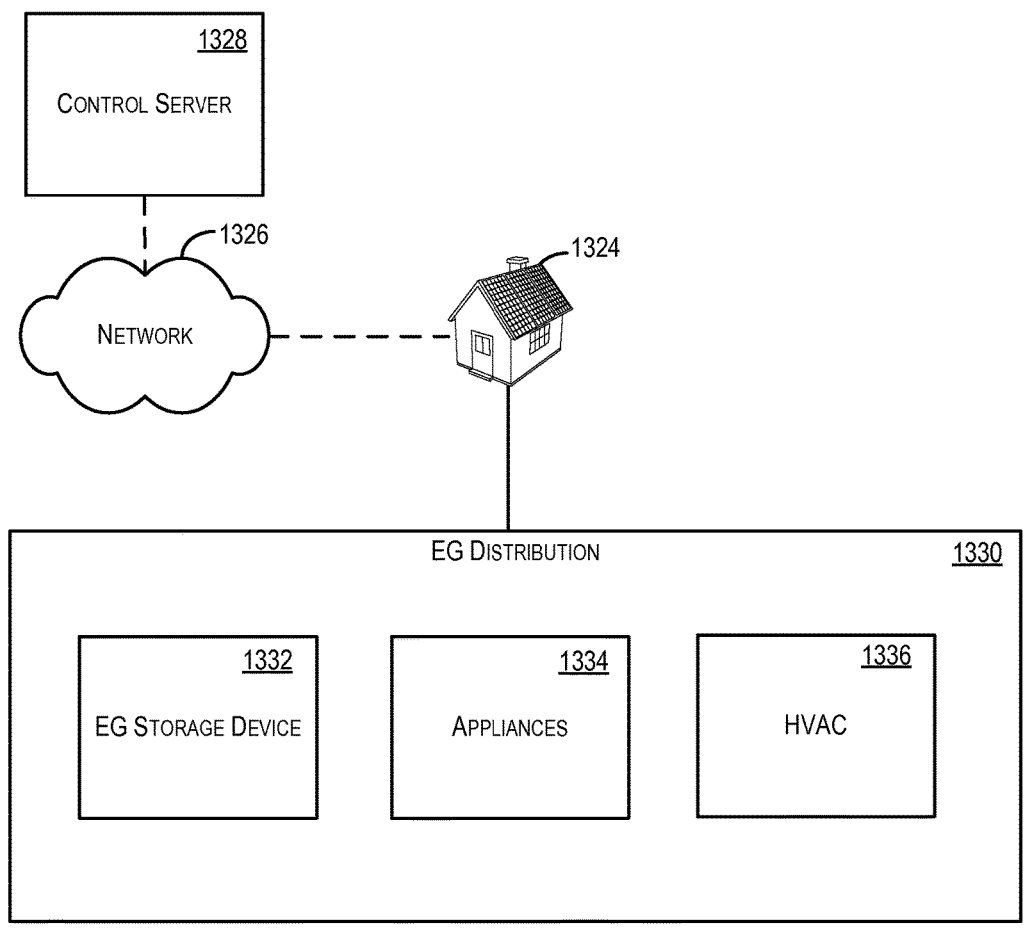
FIG. 13 shows aspects of energy generation distribution at an EG site, according to certain embodiments.

FIG. 13 shows aspects of energy generation distribution at an EG site 1324, according to certain embodiments. EG site 1324 is communicatively coupled to control server 1328 through network 1326, similar to the arrangement described above with respect to FIG. 5. EG site 1324 may include EG distribution system 1330, which may control the distribution of energy to loads including energy generation storage devices 1332, appliances 1334, HVAC system(s) 1336, or other load. EG distribution system 1330 may be contained and/or operated by any suitable resource at EG site 1324 including a gateway, inverter, or other local computing device. Alternatively, EG distribution system 1330 may be operated remotely (e.g., by control server 1328). There are many possible locations and operative resources (e.g., logic) of distribution system 1330 as would be appreciated by one of ordinary skill in the art. In some embodiments, EG distribution system 1330 can be operated by any resource of the various systems described herein (e.g., systems 500, 600, 700). In some cases, appliances 1334 and HVAC 1336 may be part of an overall site load (e.g., site load 520).

EG storage device(s) 1332 can include one or more rechargeable batteries, or other suitable energy storage technology including, but not limited to, compressed air, flywheels, pumped hydro, superconducting magnetic energy storage (SMES), or the like. Appliances (e.g., washer/dryer, hot water heater, refrigerator, etc.) 1334 and HVAC 1336 may have time-shifted operations. For instance, HVAC 1336 may be regularly scheduled to turn on at 5 P.M. to achieve a desired temperature before a homeowner arrives at 6 P.M. One example of time-shifting a load would be to turn on the HVAC at 2 P.M. in anticipation of a thunderstorm (or other event) that may result in a power outage or brown out at the regularly scheduled time of operation. In some instances, an appliance, such as a hot water heater, may act as an energy storage technology and/or operate with time-shifted load. For example, when a storm is predicted for a certain time, more photovoltaic energy may be directed to heating and storage of hot water for later use, rather than pushing excess power back to the grid (such as for net-metering credit). In an aspect, water may further be heated to a higher temperature to allow for longer use of hot water when power may not be available. In some embodiments, a charging profile for the energy storage device may include an increased charge set point when cloud cover is determined to be present and the cloud cover density is greater than a predetermined threshold value for cloud density. These concepts of proactively changing energy storage charging profiles, time-shifting loads, etc., are further discussed below at least with respect to FIGS. 14-19.

Charging Considerations for an Energy Storage Device

Aspects of the present disclosure are directed to, among other things, charging profiles for a storage device in an energy generation systems. In some cases, the longevity of the storage capability of a battery may be increased if the battery is charged during its operating life accordingly to certain criteria. In some instances, routinely charging a battery to 90% of its maximum charge, rather than 100% of its maximum charge, can prolong the life (storage capability) of the battery. Aspects of the disclosure include different charging profiles with these principles in mind. Specifically, aspects are directed to battery charging profiles that may be selected based on near term weather conditions (e.g., thunderstorms, high winds, etc.), alerts (e.g., rioting, brown out warnings, etc.), or local natural disasters (e.g., earthquakes, tornadoes, hurricanes, wildfires, etc.), referred to as, e.g., event data, which may be received via news feeds, social media, web resources, or other suitable resources, such as, for example the Emergency Alert System (EAS). Under these conditions, a probability that a power outage will occur is determined and a battery can be charged based on this probability. For instance, a battery can be charged according to a first charging profile when the probability is below a predetermined threshold value (i.e., a power outage is unlikely). The battery can be charged according to a second charging profile when the probability is at or above the predetermined threshold value (i.e., a power outage is likely). A maximum charge set point of the storage device for the first charging profile can be less than the storage capacity of the storage device (e.g., 90% of maximum storage capacity), thereby maintaining a charging profile that helps prolong the life of the battery. A maximum charge set point of the storage device for the second charging profile can be at the storage capacity of the storage device (e.g., 100% of the maximum storage capacity), which may afford the user access to additional power during times when electricity from the local utility grid may not be available. The storage device can be charged according to the first charging profile under normal operating conditions.

Battery Charging System

Figure 14:
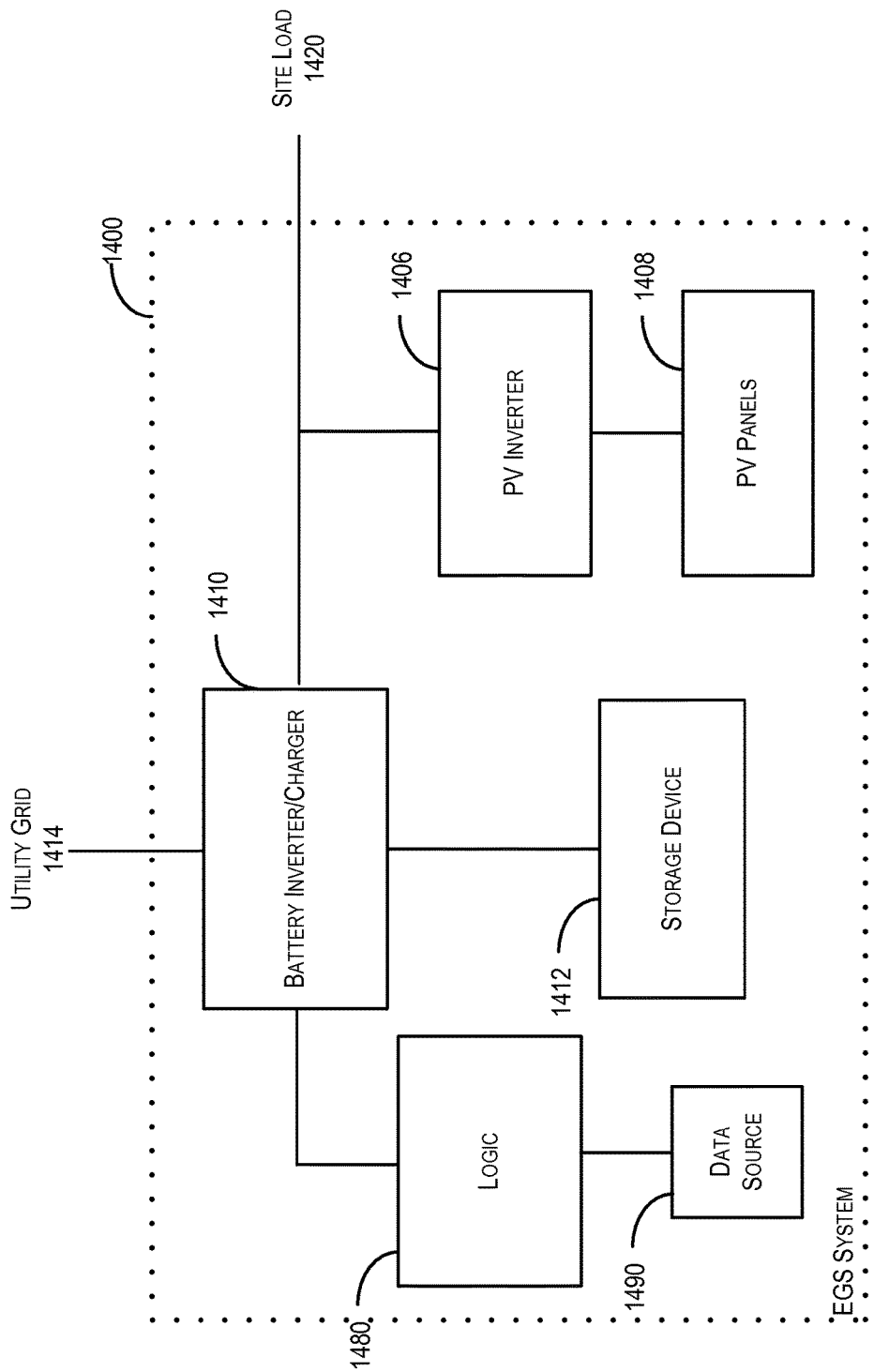
FIG. 14 shows a simplified block diagram of a PV-based energy generation and storage (EGS) system, according to certain embodiments.

FIG. 14 is a simplified block diagram of a PV-based EGS system 1400, according to certain embodiments. EGS system 1400 includes a PV-based energy generation subsystem comprising a PV inverter 1406 and one or more PV panels 1408, and a battery-based energy storage subsystem comprising a battery inverter/charger 1410 and a battery device 1412. In some embodiments, PV inverter 1406 and battery inverter/charger 1410 can be combined into a single device. In the example of FIG. 14, EGS system 1400 is grid-connected; thus, PV inverter 1406 and battery inverter/charger 1410 are electrically connected to the utility grid (1414) via a main panel and a utility meter (not shown). Further, to provide power to site 1400, utility grid 1414, PV inverter 1406, and battery inverter/charger 1410 are electrically connected to site load 1420 (e.g., lights, appliances, etc.). Logic block 1480 is coupled to battery inverter/charger 1410. Logic block 1480 receives input from a data source 1490, which can include multiple data sources, data types, etc., including but not limited to weather data, alert data, social media, and more. Data from data source 1490 (referred to as event data) can be used to dictate a type of charging profile to apply to battery device 1412, as further discussed below. Any type of data can be fed into logic block 1480, as would be appreciated by one of ordinary skill in the art. EGS system can be similar to the EGS system shown in FIG. 5. Alternatively, system 1400 can include multiple storage devices (batteries), multiple energy generation resources (not limited to PV power), or different topologies, as would be appreciated by one of ordinary skill in the art with the benefit of this disclosure. In some embodiments, storage devices can be charged by an EG system (e.g., PV panel system), by the utility grid (e.g., during periods of low energy cost), or combinations thereof.

Logic block 1480 controls a charging profile for battery device 1412 through battery charger 1410. In some cases, the longevity of the storage capability of a battery may be increased if the battery is charged during its operating life accordingly to certain criteria. In some instances, routinely charging a battery to a value lower than its maximum charge (e.g., 90%) can prolong the life (storage capability) of the battery. In certain embodiments, logic block 1480 provides an appropriate charging profile based on certain conditions to balance the interests of maximizing the life of the battery and providing a maximum available charge for a user, particularly during times when power is limited or unavailable from the utility grid 1414. Logic block 1480 provides different charging profiles with these principles in mind including battery charging profiles that may be selected based on near term events that may lead to a loss of power from the utility grid 1414. Some of these events may include weather conditions (e.g., thunderstorms, high winds, etc.), blackouts/brownouts due to high energy use in a grid network, natural disasters (e.g., earthquakes, tornadoes, hurricanes, wildfires, etc.), and the like, which may be received via any suitable data source 1490 including news feeds, social media, alert data, web resources, or other suitable resource, as further discussed below.

Logic block 1480 can further detect whether one or more storage devices 1412 are connected to EGS system 1400 and determine their storage capacity. Logic block 1480 can provide a charging profile that can be based on a past, present, and/or future load requirement, based on charging to maximize an economic benefit (e.g., feeding power back to utility grid 1414, reducing a peak load value, etc.), based on event data from data source 1490. Logic block 1480 can be located in a separate device, integrated in another device (e.g., part of battery inverter/charger 1410), or located local or remote (off-site logic from a control server 528), or any combination thereof, as would be appreciated by one of ordinary skill in the art. In some implementations, system 1400 can be an extension of EGS system 502 (see FIG. 5).

Energy Storage Device Charging Profiles

There are many types of energy storage devices (batteries) that can be used in solar systems. Some commonly used battery technologies include Lithium Ion (Li-ion), Lead Acid, Nickel Cadmium (NiCad), Nickel Iron (NiFe), and more. Li-ion batteries, for example, are rechargeable and can have very long operating lives if well maintained. For maximizing the operating life of a battery, the optimal charging state includes a partial charge (60-70%) and idle activity (i.e., not charging or discharging). Charging to or maintaining at 100% charge or maintaining a zero charge actually reduces the operating life of a battery. Furthermore, frequent charging and discharging (cycling) can further reduce the operating life. Thus, frequent charge cycling and/or fully charging and discharging a battery can prematurely reduce its charge capacity over time. On the other hand, owners of solar systems may benefit more from having a maximum available charge on hand to sufficiently provision local loads and reduce energy cost. Thus, various charging profiles can be used with these competing issues in mind. In some embodiments, a 90% maximum charge profile is used because it provides sufficient back up power for the solar system and corresponding load, yet still limits the maximum charge state of the battery to support longer battery life. In instances where a power outage (off-grid event) is imminent due to a lightning storm, social unrest, war, or other event that may cause the power grid to shut down, a 100% maximum charging profile can be used to provide more available back up power in the event that the power outage occurs.

In some solar systems, multiple energy storage devices may be used. In one configuration, two batteries can be used with each having different performance characteristics. A first battery may have a lower capacity but superior cycling performance (less degradation due to cycling). The second battery may have high capacity but a comparatively lower cycling performance. During normal operation or when a low probability of an off-grid event is imminent, the low capacity, high-cycle battery can be used as a primary energy storage device. If there is a high probability of an off-grid event, then the high storage, low-cycle battery can be fully charged. Any suitable charging profile can be used and may be selected based on any criteria including battery longevity, lower cost, power efficiency, or the like, as would be appreciated by one of ordinary skill in the art.

Figure 15A:
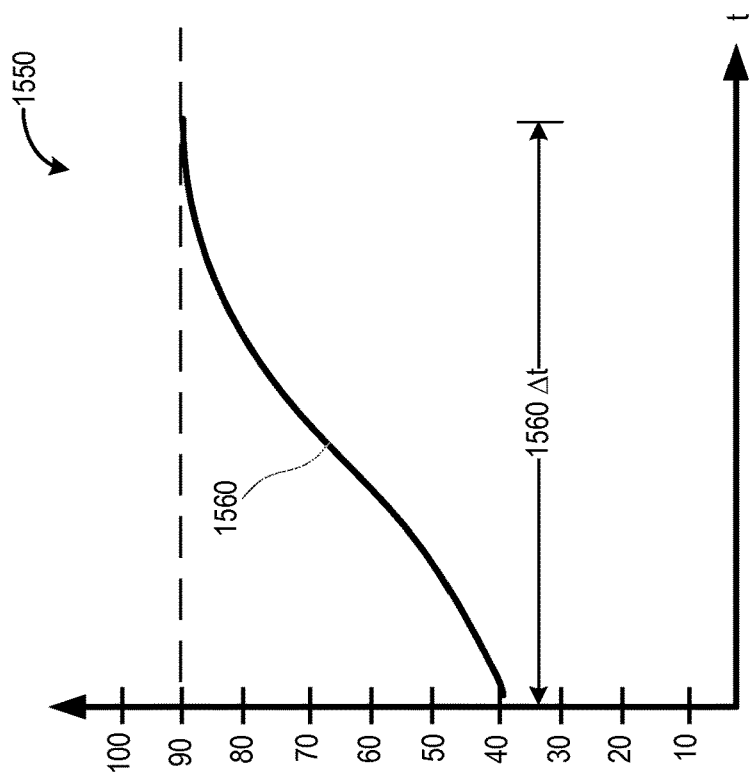
FIG. 15A shows a number of storage device charging profiles in an EG system, according to certain embodiments.

FIG. 15A shows a number of storage device charging profiles 1500 in an EGS system, according to certain embodiments. The y-axis shows a percentage charge of one or more storage devices (from 0-100%). The x-axis shows a time scale, which may be any suitable scale including second, minutes, hours, or other time-based denomination. As discussed above, the longevity of the storage capability of a storage device (e.g., battery) may be increased if the battery is charged during most of its operating life to a value lower than its maximum charge capacity. The examples described herein use 90% as the maximum charge value under normal operating conditions. This is not limiting and other maximum values (e.g., 80%, 95%, etc.) under normal operating conditions can be used. Furthermore, the maximum value under normal operating conditions may change over time (i.e. increase or decrease linearly, non-linearly, etc.) based on load requirements, storage device capabilities, utility needs, or the like, as would be appreciated by one of ordinary skill in the art. Charging profiles may be controlled, for example, by logic block 1480 of FIG. 14.

"Normal" operating conditions typically refers to periods of time where a black out from utility 1414 is not imminent, such as during inclement weather, natural disasters that can damage the utility, utility energy distribution problems (brown outs, etc.), or other event that can cause stop power (from a utility) from reaching a user site (residence, commercial site, etc.). In some embodiments, the likelihood or probability of a blackout is determined, which dictates whether a storage device should be charged under "normal" operating conditions, or under "storm mode" conditions, as further described below.

Referring to FIG. 15A, charging profile 1510 shows a storage device being linearly charged from 40% to 90% at a certain rate over a first time interval 1510. Charging profiles 1520-1540 show different linear charge rates over different time intervals up to a maximum charge of 90%. Under normal operating conditions, storage device 1412 is routinely charged up to the 90% maximum at any suitable rate in an effort to maximize its operating life. Any suitable charging rate can be used. In some instances, faster or slower charge rates (up to 90%) can be used based on a number of considerations. A charging rate may also affect the longevity of a storage device, so slower or faster rates may be used accordingly. Load requirements may affect the rate at which a storage device is charged. For instance, under periods of heavy loads, the storage device may receive little charge with a very slow charging rate or no charge at all. In contrast, during periods of light loads, the storage device may be charged at a faster rate. There are many factors that can dictate the charge rate of a storage device, which would be appreciated by one of ordinary skill in the art. However, the maximum charge under normal operating conditions is typically set to a value lower than the maximum available storage of the storage device.

Figure 15B:
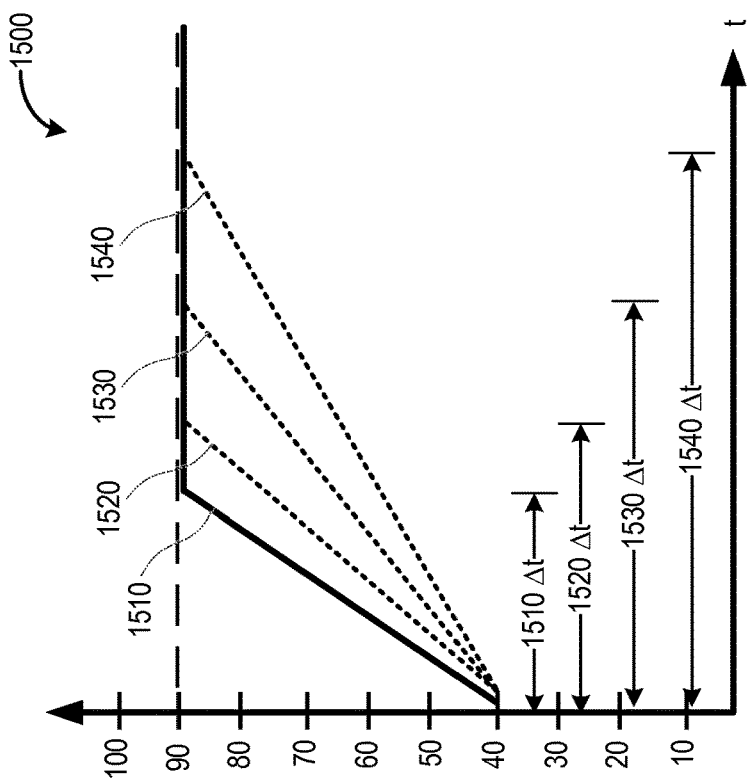
FIG. 15B shows a storage device charging profile in an EG system, according to certain embodiments.

FIG. 15B illustrates a charging profile under normal operating conditions with a non-linear charge rate. In practice, charging profiles will typically be non-linear due to the reasons given above including competing interests such as load requirements, utility back feeding incentives, or other considerations. In some cases, the charging profile may be intermittent. A wide variety of charging profiles are possible, but a charging principle common to each charging profile is that the maximum allowed charge is lower than the maximum storage capacity of the storage device to improve its operating life (ability to store a charge). Here, the maximum charged is 90% capacity. Furthermore, it should be understood that the charging profiles described herein are merely simplified examples and do not necessarily represent actual typical charge rates for storage devices.

Figure 16B:
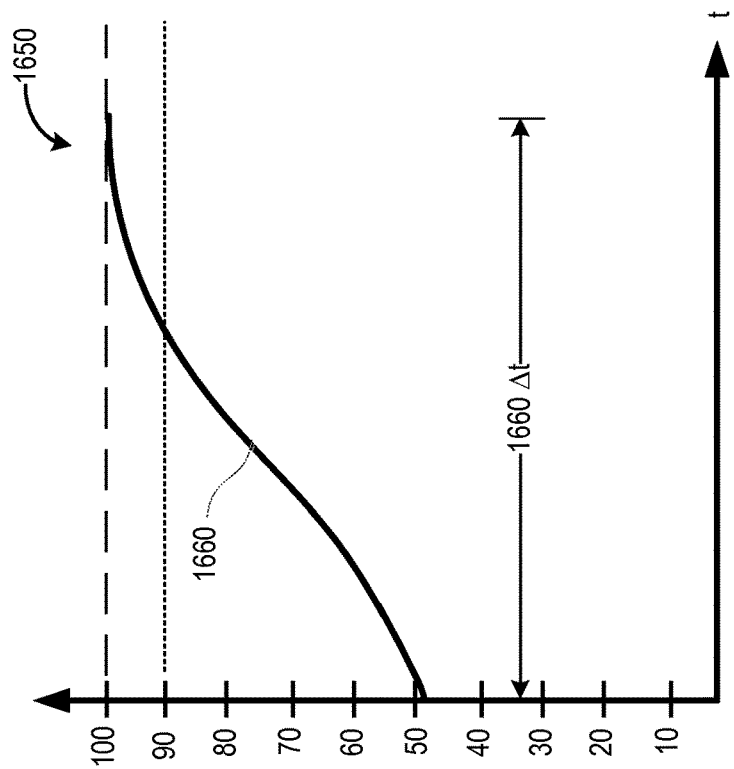
FIG. 16B shows a storage device charging profile in an EG system, according to certain embodiments.
Figure 16A:
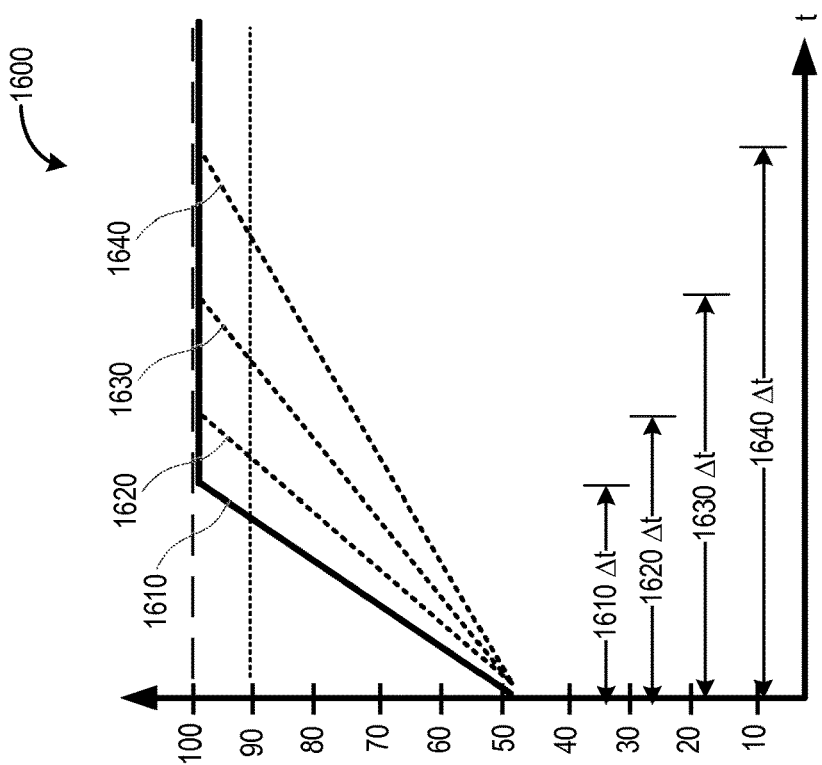
FIG. 16A shows a number of storage device charging profiles in an EG system, according to certain embodiments.

FIG. 16A shows a number of storage device charging profiles 1600 in an energy generation (EG) system, according to certain embodiments. The y-axis shows a percentage charge of one or more storage devices (from 0-100%). The x-axis shows a time scale, which may be any suitable scale including second, minutes, hours, or other time-based denomination. In contrast to the "normal" operating conditions discussed above, the charging profiles shown in FIGS. 16A-16B show "storm-mode" conditions. Charging profiles may be controlled, for example, by logic block 1480 of FIG. 14.

"Storm mode" operating conditions typically refer to periods of time where a black out from utility 1414 is imminent, such as during inclement weather, natural disasters that can damage the utility, utility energy distribution problems (brown outs, etc.), or other event that can cause stop power (from a utility) from reaching a user site (residence, commercial site, etc.). In some embodiments, the likelihood or probability of a blackout is determined, which dictates whether a storage device should be charged under "normal" operating conditions, or under "storm mode" conditions. Although "storm-mode" connotes a mode predicated on weather conditions, other events may trigger this charging mode, as further discussed below. The likelihood or probability that a blackout condition could occur may be determined by logic block 1480 and based on event data from a data source 1490, as previously discussed.

As discussed above, the longevity of the storage capability of a storage device (e.g., battery) may be increased if the battery is charged during most of its operating life to a value lower than its maximum charge capacity, such as 90%. In storm mode, a primary concern is making the most amount of power available to a user during periods of time where a blackout condition may occur. In some cases, the charge rate may be as fast as possible to ensure that the storage device receives the maximal amount of charge in the shortest amount of time, although other charge rates are possible.

Referring to FIG. 16A, charging profile 1610 shows a storage device being linearly charged from 40% to 100% at a certain rate over a first time interval 1610. Charging profiles 1620-1640 show different linear charge rates over different time intervals up to a maximum charge of 100%. As mentioned above, any suitable charging rate can be used. In some instances, faster or slower charge rates (up to 100%) can be used based on a number of considerations. Load requirements may affect the rate at which a storage device is charged. For instance, under periods of heavy loads, the storage device may receive little charge with a very slow charging rate or no charge at all. In contrast, during periods of light loads, the storage device may be charged at a faster rate. There are many factors that can dictate the charge rate of a storage device, which would be appreciated by one of ordinary skill in the art. However, the maximum charge in "storm mode" is typically set to a maximum available storage of the storage device (i.e., 100%).

FIG. 16B illustrates a charging profile under "storm-mode" operating conditions with a non-linear charge rate. In practice, charging profiles may typically be non-linear due to the reasons given above including competing interests such as load requirements, utility back feeding incentives, or other considerations, however the interest in maximizing a charge on a storing device in anticipation of a looming blackout will typically produce faster charge rates than during "normal" operating conditions. In some cases, the charging profile may be intermittent. A wide variety of charging profiles are possible, but a charging principle common to each charging profile is that the maximum allowed charge is set to the maximum storage capacity of the storage device to achieve a full charge. Here, the maximum charged is 100% capacity. It should be understood that the charging profiles described herein are simplified examples and do not necessarily represent actual typical charge rates for storage devices. Furthermore, the charging profiles described herein can be applied to any of the foregoing and preceding embodiments.

Figure 17:
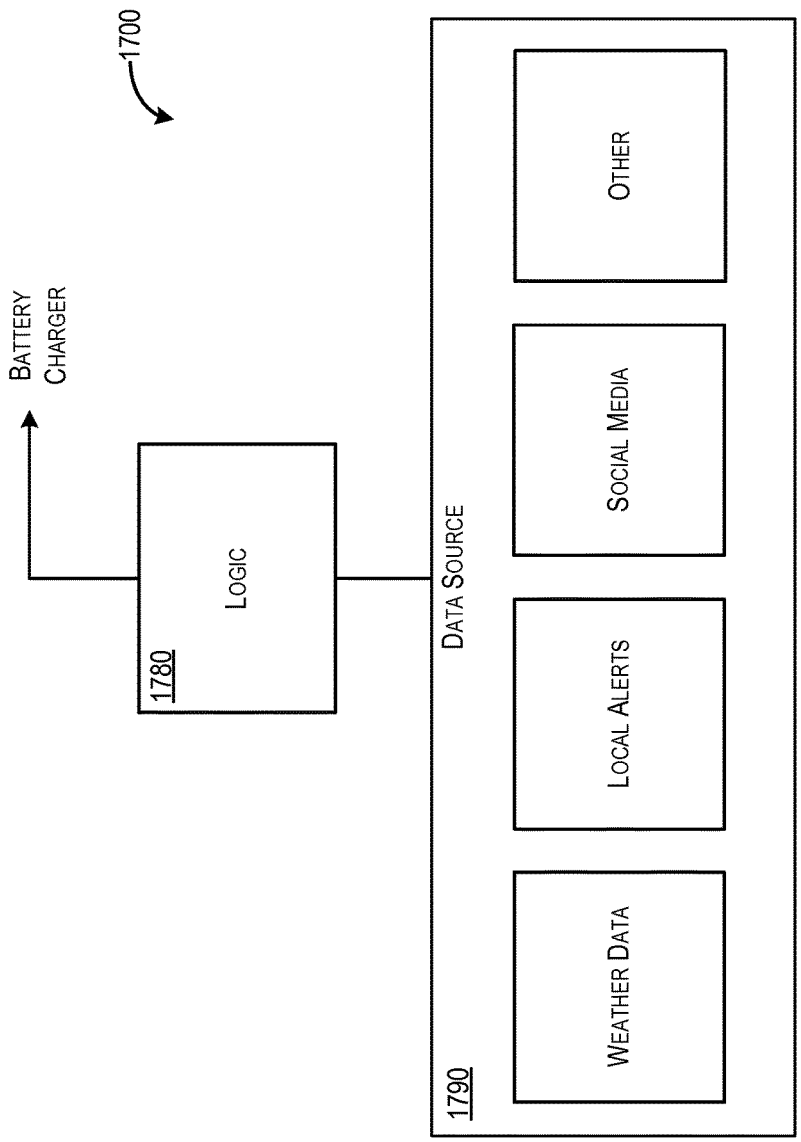
FIG. 17 shows several examples of event data that can be used to determine a charging profile for a storage device, according to certain embodiments.

FIG. 17 shows several examples of event data that can be used to determine a charging profile for a storage device, according to certain embodiments. Data source 1790 provides event data to logic block 1780.

Data source 1790 may include event data such as weather data, alert data, social media data, web services data, or any other suitable information-based input that can help logic block 1780 determine if a power outage (e.g., black out condition) is likely to occur. Weather data can come from any number of sources including websites, radio/TV (with an appropriate decoder), or other weather resource that can provide a weather forecast over a predetermined period of time (e.g., over the next 24-48 hours). For instance, forecast of heavy thunderstorms, tornadoes, hurricane or tropical storms, high winds, etc., may likely cause a power outage. Forecasts of mild weather would be unlikely to cause a power outage.

Alerts may provide logic block 1780 with information to help determine if a power outage is likely to occur. For instance, logic block 1780 may determine a probability of a power outage based on an alert. Alerts can be local, regional, or national and may be provided by any suitable means (e.g., Emergency Broadcast System). Alerts can be related to weather, civil unrest, war, terrorism, third-world scenarios that may affect the continuity of the grid (e.g., flooding, rolling power outages, etc.) indications of possible brownouts, natural disasters, or any type of information that relates to a probability or likelihood of a power outage over a predetermined period of time (e.g., within 24-48 hours). Any period of time may be used.

Social media outlets (Facebook®, Twitter®, Tumblr®, Vine®, etc.) may provide logic block 1780 with information to help determine if a power outage is likely to occur. For instance, logic block 1780 may determine a probability of a power outage based on a post, blog, video, or other resource. Social media outlets may provide information about weather, civil unrest, terrorism, war, indications of possible brownouts, natural disasters, or any type of information that relates to a probability or likelihood of a power outage over a predetermined period of time (e.g., within 24-48 hours). Any period of time may be used. It should be noted that although the examples described herein describe the determination of a probability of a power outage, some embodiments may alternatively, or additionally, determine the probability of a brown-out condition (as opposed to a full outage) and apply an appropriate charging profile.

"Other" data sources include any conceivable data source can be used provided that it includes information that logic block 1780 can use to determine a likelihood or probability of an off-grid event (power outage) and take appropriate action (apply a "normal" or "storm-mode" charging profile). For instance, data from certain home meters and/or appliances may indicate whether a home is currently occupied (e.g., via motion detection). This data can be used to inform an appropriate charging profile. For instance, data indicating that a home has not been occupied for several days (e.g., family on vacation) may cause logic 1780 to maintain the first charging profile (e.g., normal mode) over the second charging profile ("storm mode"), even with a high probability of a power outage because the occupants may not be home to use the extra stored energy. In some implementations, logic 1780 may maintain the "normal mode" charging profile even with a high probability of an off-grid event because the house may have a history of surplus power even under high load conditions. That is, the extra energy stored in "storm mode" charging profiles (e.g., extra 10% charge) may not be needed because the "normal mode" charging profile has provided adequate power during the entire operating life of the solar power system.

In certain embodiments, logic block 1780 may receive storm forecast data from a weather tracking system (shown as "other" in data source 1790), as shown and described above at least with respect to FIGS. 4-13. It should be understood that any and all aspects of the various systems and methods described herein can be combined, substituted, integrated, or otherwise mixed and matched in any suitable manner, as would be appreciated by one of ordinary skill in the art with the benefit of this disclosure.

Figure 18:
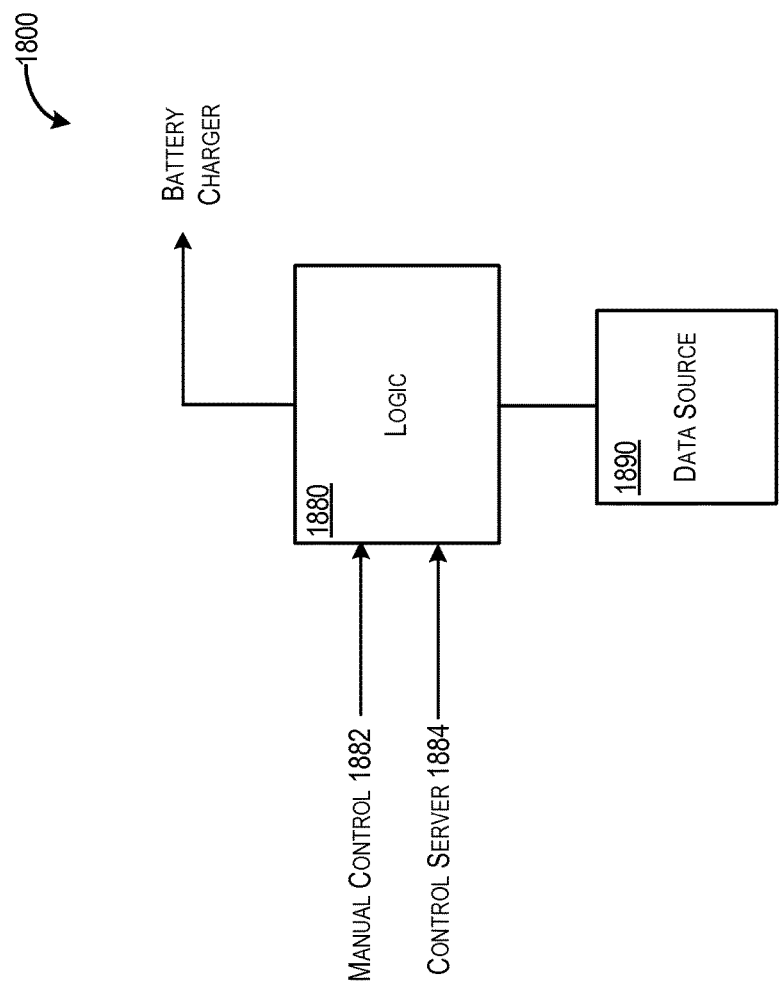
FIG. 18 shows alternative methods of controlling a charging profile in a storage device, according to certain embodiments.

FIG. 18 shows alternative methods of controlling a charging profile in a storage device, according to certain embodiments. Logic block 1880 can determine which charging profile to apply to a storage device based on data source 1890. Alternatively, logic block 1880 may accept inputs from manual control 1882 or from a control server 1884. Logic block 1880 may function similarly to logic block 1480 and 1780 in FIGS. 14 and 17, respectively.

Manual control 1882 may be a manual override switch that is accessible by a user (e.g., home owner). For instance, a user may wish to immediately switch to a "storm-mode" charging profile, regardless of the current inputs from data source 1890. Manual control 1882 can be a physical button or switch, e.g., on the storage device charging system, or it may be a remote controlled function accessible via a web portal, smart phone, or other wireless means. When manual control 1882 is turned off, logic block 1880 can return to its standard operating procedure, as discussed above.

Control server 1884 may control logic block 1880, according to certain embodiments. Control server 1884 may be controlled remotely by an entity other than the user (e.g., homeowner). For instance, control server 1884 may operate similarly to control server 528 of FIG. 5. In some embodiments, control server 1884 may control the charging profile for storage device (not shown) based on its own data sources. For example, control server 1884 may receive weather data, alert data, social media data, or other data to help it determine if a power outage is likely to occur at the user site. Thus, all of the functions described above with respect to logic block 1880 may be performed by a control server 1884, which in turn can control the charging profile of a storage device at a user site. The myriad combinations and implementations of manual control, remote control (via remote entity), and the like would be appreciated by one of ordinary skill in the art with the benefit of this disclosure.

Figure 19:
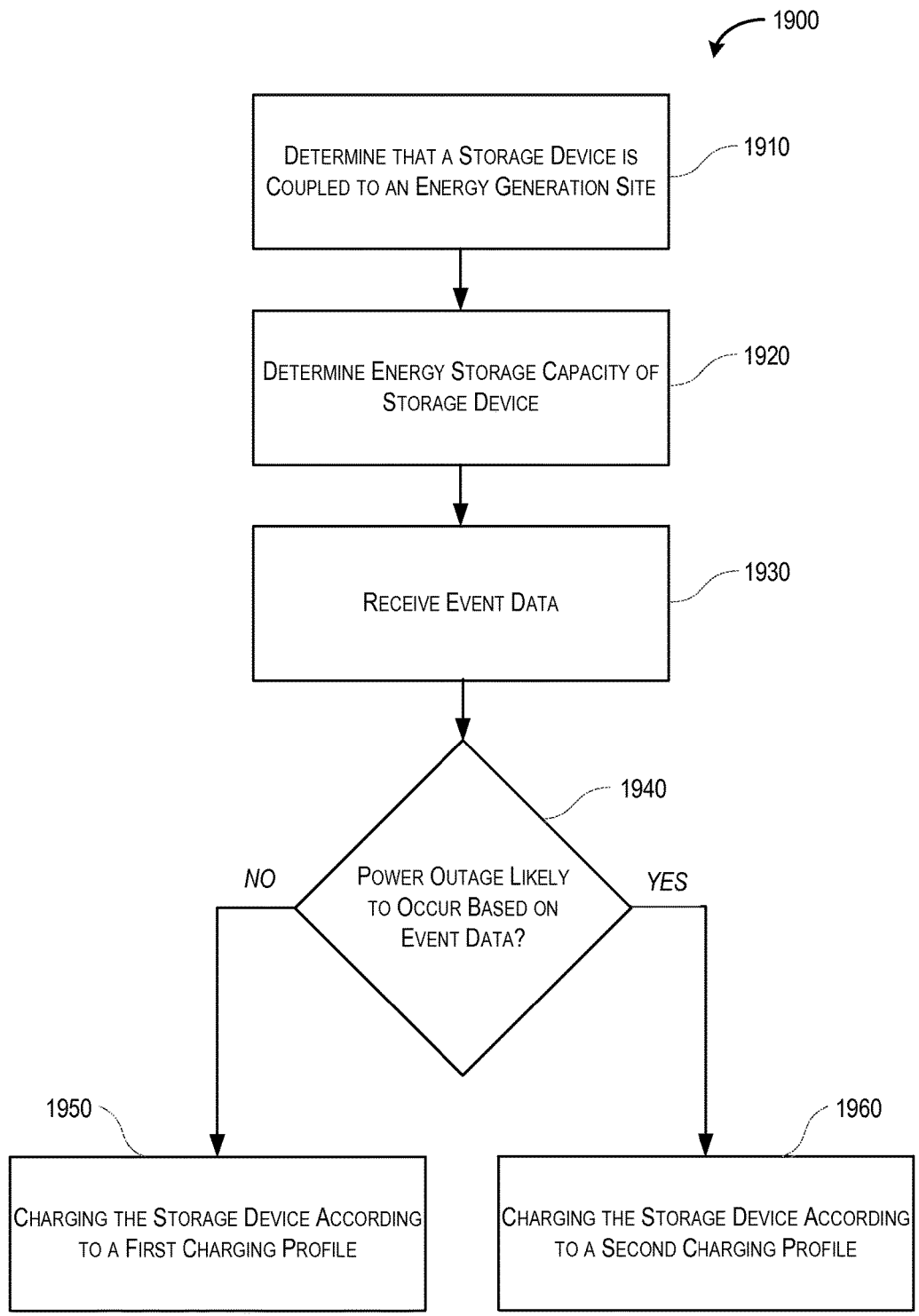
FIG. 19 shows a simplified flow diagram showing aspects of a method of charging a storage device, according to certain embodiments.

FIG. 19 depicts a simplified flow diagram showing aspects of a method 1900 of charging a storage device, according to certain embodiments. Method 1900 is performed by processing logic that may comprise hardware (e.g., circuitry, dedicate logic, etc.), software (which is run on a general purpose computing system or a dedicated machine), firmware (embedded software), or any combination thereof. In one embodiment, method 1900 can be performed by logic block 1480 (FIG. 14), 1780 (FIG. 17), 1880 (FIG. 18) or processor 502 of FIG. 5.

Referring to FIG. 19, method 1900 begins with determining that a storage device is coupled to an energy generation site (1910). For example, logic block 1480 may determine that a storage device is electrically connected to an energy generation site. In some cases, multiple storage devices may be used. At 1920, the energy storage capacity of the storage device is determined. The energy storage capacity can be the maximum amount of electrical charge that can be stored in the storage device(s).

At 1930, logic block 1480 receives event data from data source 1490. Event data may include weather data, alert data, social media data, web services data, or any other suitable information-based input that can help logic block 1480 determine if a power outage (e.g., black out condition) is likely to occur. Weather data can come from any number of sources including websites, radio/TV (with an appropriate decoder), or other weather resource that can provide a weather forecast over a predetermined period of time (e.g., over the next 24-48 hours). Alerts can be local, regional, or national and may be provided by any suitable means, as discussed above. Social media outlets may provide information about weather, civil unrest, war, indications of possible brownouts, natural disasters, or any type of information that relates to a probability or likelihood of a power outage over a predetermined period of time (e.g., within 24-48 hours). It should be understood that any conceivable data source can be used provided that it includes information that logic block 1480 can use to determine a likelihood or probability of a power outage and take appropriate action (e.g., apply a "normal" or "storm-mode" charging profile).

At 1940, logic block 1480 determines whether a power outage is likely to occur based on the event data. In some cases, logic block 1480 may determine that the probability of a power outage is above a predetermined threshold value. The predetermined threshold value can be a 70% chance, 80% chance, or other suitable threshold value. For instance, if the event data indicates 90% change of heavy thunderstorms or a hurricane, logic block 1480 may determine that the probability of a power outage is above a predetermine threshold value (percentage), or that a power outage is likely. Probability can be determined based on prior black-out data, brown-out data, the proximity of a particular warning or event, predetermined triggers from a utility system (e.g., alerting an impending system shutdown), and the like.

At 1950, if logic block 1480 determines that a power outage is not likely, or the probability of a power outage is less than the predetermined threshold value, then storage device 1412 is charged according to a first charging profile. In some embodiments, the first charging profile may have a maximum charge of 90% of the storage capacity of the storage device, as shown and described in FIGS. 15A-15B.

At 1960, if logic block 280 determines that a power outage is likely, or the probability of a power outage is at or higher than the predetermined threshold value, then storage device 212 is charged according to a second charging profile. In some embodiments, the second charging profile may have a maximum charge of 100% of the storage capacity of the storage device, as shown and described in FIGS. 16A-16B.

It should be appreciated that the specific steps illustrated in FIG. 19 provide a particular method of charging a storage device, according to certain embodiments. Other sequences of steps may also be performed according to alternative embodiments. For example, different thresholds, charging rates, or manual override features can be included. Furthermore, certain embodiments of method 1900 may perform the individual steps in a different order, at the same time, or any other sequence for a particular application, as noted above. Moreover, the individual steps illustrated in FIG. 19 may include multiple sub-steps that may be performed in various sequences as appropriate to the individual step. Additional steps may be added or removed depending on the particular applications. For instance, some embodiments may skip the determination of the presence and capacity of a storage device (if that information is already known or supplied). One of ordinary skill in the art would recognize and appreciate many variations, modifications, and alternatives of the method.

Figure 20:
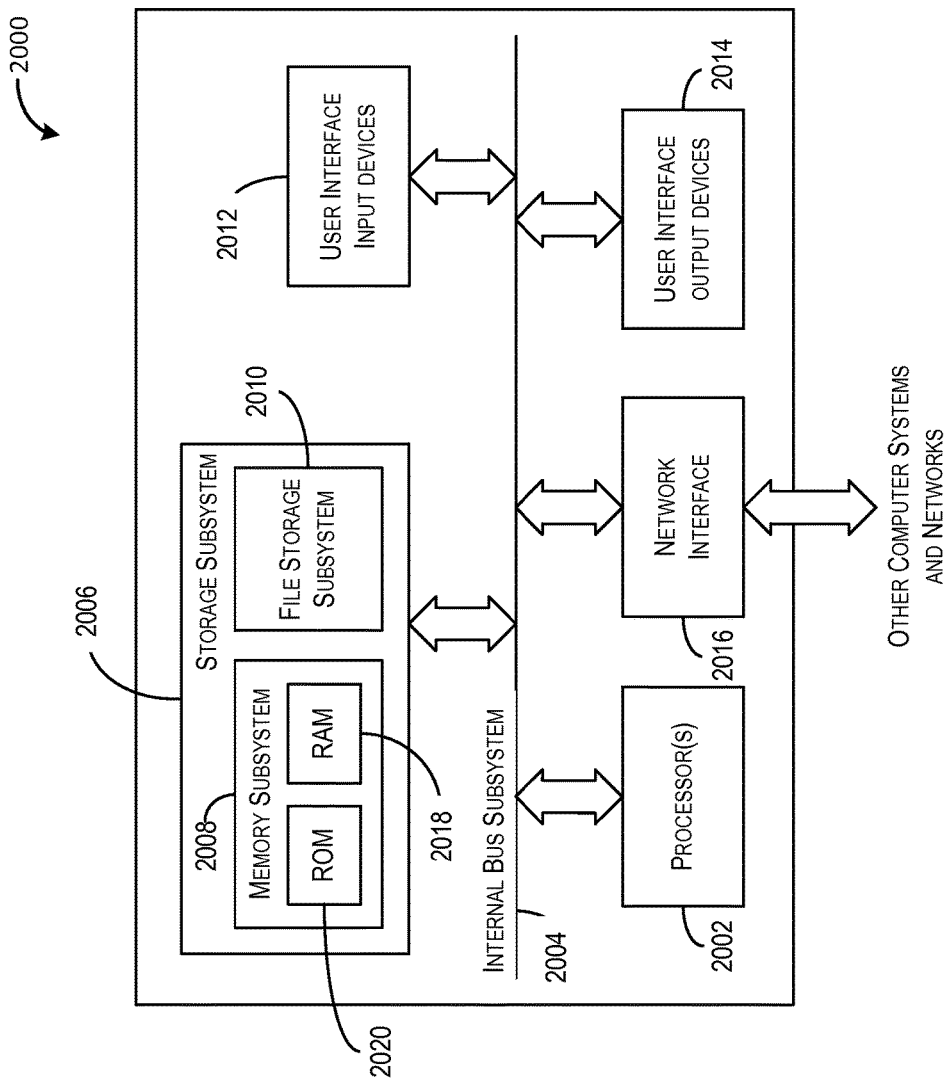
FIG. 20 shows a simplified block diagram of computer system, according to certain embodiments.

FIG. 20 is a simplified block diagram of computer system 2000, according to certain embodiments. Computer system 2000 can be used to implement any of the computer systems/devices (e.g., control server 528, gateway devices 524, logic block 1480) described with respect to FIGS. 1-19. As shown in FIG. 20, computer system 2000 can include one or more processors 2002 that communicate with a number of peripheral devices via a bus subsystem 2004. These peripheral devices can include storage subsystem 2006 (comprising memory subsystem 2008 and file storage subsystem 2010), user interface input devices 2012, user interface output devices 2014, and a network interface subsystem 2016.

In some examples, internal bus subsystem 2004 can provide a mechanism for letting the various components and subsystems of computer system 2000 communicate with each other as intended. Although internal bus subsystem 2004 is shown schematically as a single bus, alternative embodiments of the bus subsystem can utilize multiple buses. Additionally, network interface subsystem 2016 can serve as an interface for communicating data between computer system 2000 and other computer systems or networks. Embodiments of network interface subsystem 2016 can include wired interfaces (e.g., Ethernet, CAN, RS232, RS485, etc.) or wireless interfaces (e.g., ZigBee, Wi-Fi, cellular, etc.).

In some cases, user interface input devices 2012 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 2000. Additionally, user interface output devices 2014 can include a display subsystem, a printer, or non-visual displays such as audio output devices, etc. The display subsystem can be any known type of display device. In general, use of the term "output device" is intended to include all possible types of devices and mechanisms for outputting information from computer system 2000.

Storage subsystem 2006 can include memory subsystem 2008 and file/disk storage subsystem 2010. Subsystems 2008 and 2010 represent non-transitory computer-readable storage media that can store program code and/or data that provide the functionality of embodiments of the present disclosure. In some embodiments, memory subsystem 2008 can include a number of memories including main random access memory (RAM) 2018 for storage of instructions and data during program execution and read-only memory (ROM) 2020 in which fixed instructions may be stored. File storage subsystem 2010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 2000 is illustrative and not intended to limit embodiments of the present disclosure. Many other configurations having more or fewer components than system 2000 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
receiving, by a processor, power measurement data for a photovoltaic (PV)-based energy generation (EG) site, the power measurement data including:
a present power output of the EG site; and
a historical power output of the EG site;
determining whether cloud cover is present over the EG site based on the present and historical power outputs for the EG site;
calculating a density of the cloud cover over the EG site based on the present and historical power outputs for the EG site; and
controlling a charging profile of one or more energy storage devices of the EG site based on the determined presence and calculated density of the cloud cover,
wherein the charging profile for the one or more energy storage devices includes an increased charge set point when cloud cover is determined to be present than when cloud cover is determined not to be present and the cloud cover density is greater than a predetermined threshold value for cloud density, and
wherein the charging profile for the one or more energy storage devices includes a higher charge rate when cloud cover is determined to be present than when cloud cover is determined not to be present.

2. The method of claim 1 wherein the power measurement data corresponding to the present power output of the EG site is received from the EG site, and
wherein the power measurement data corresponding to the historical power output of the EG site is received from a database.

3. The method of claim 1 wherein the historical power output is an average power output for the EG site for a previous period of time.

4. The method of claim 1 further comprising:
calculating a difference between the present power output and the historical power output for the EG site, wherein cloud cover is determined to be present over the EG site when the difference between the present power output and historical power output of the EG site is greater than a predetermined threshold value for cloud cover.

5. The method of claim 1 wherein calculating the density of the cloud cover is based on a percentage difference in power output between the present power output and the historical power output.

6. The method of claim 1 wherein the controlled load characteristics of the EG site further include a time-shifting load profile of the EG site.

7. The method of claim 1 further comprising: receiving weather forecast data;
determining a vector of the determined cloud cover based on the weather forecast data;
determining one or more EG sites in a path of the cloud cover based on the determined vector; and
controlling load characteristics of the one or more EG sites in the path of the cloud cover based on the determined presence and calculated density of the cloud cover over the EG site.

8. A system comprising:
one or more processors; and
one or more non-transitory computer-readable storage mediums containing instructions configured to cause the one or more processors to perform operations including:
receiving, by a processor, power measurement data for a photovoltaic (PV)-based energy generation (EG) site, the power measurement data including:
a present power output of the EG site; and
a historical power output of the EG site;
calculating a difference between the present power output and the historical power output for the EG site;
determining whether cloud cover is present over the EG site based on the difference between the present and historical power outputs for the EG site;
calculating a percentage difference between the present power output and the historical power output for the EG site;
calculating a density of the cloud cover over the EG site based on a percentage difference between the present and historical power outputs for the EG site; and
controlling a charging profile for an energy storage device associated with the EG site based on the determined presence and density of the cloud cover over the EG site,
wherein the charging profile for the energy storage device includes an increased charge set point when cloud cover is determined to be present than when cloud cover is determined not to be present and the cloud cover density is greater than a predetermined threshold value for cloud density, and
wherein the charging profile for the energy storage device includes a higher charge rate when cloud cover is determined to be present than when cloud cover is determined not to be present.

9. The system of claim 8 wherein the power measurement data corresponding to the present power output of the EG site is received from the EG site, and
wherein the power measurement data corresponding to the historical power output of the EG site is received from a database.

10. The system of claim 8 wherein the historical power output is an average power output for the EG site for a previous predetermined period time.

11. The system of claim 8 further comprising:
receiving weather forecast data;
determining a vector of the determined cloud cover based on the weather forecast data;
determining one or more EG sites in the path of the cloud cover based on the determined vector; and
controlling load characteristics of the one or more EG sites in the path of the cloud cover based on the determined presence and calculated density of the cloud cover over the EG site.

12. A computer-implemented method comprising:
receiving, by a processor, power measurement data for a plurality of photovoltaic (PV)-based energy generation (EG) sites, wherein the power measurement data includes:
a present power output of each of the plurality of EG sites; and a historical power output of each of the plurality of EG sites;

calculating, by the processor, a density of cloud cover over each EG site based on a percentage difference between a present power output and historical power output for the corresponding EG site;

determining, by the processor, that a density of cloud cover at a first EG site of the plurality of EG sites exists at a second EG site of the plurality of EG sites after a period of time;

calculating, by the processor, a vector path for the cloud cover based on:
- a location of the first EG site;
- a location of the second EG site; and
- the period of time;

determining, by the processor, a third EG site of the plurality of EG sites having a location in the vector path of the cloud cover; and controlling a charging profile for one or more energy storage devices of the third EG site based on a forecasted effect of a power output of the third EG site, wherein the charging profile for the one or more energy storage devices of the third EG site includes an increased charge set point when the third EG site is located in the vector path of the cloud cover than when the third EG site is not located in the vector path of the cloud cover, and wherein the charging profile for the one or more energy storage devices of the third EG site includes a higher charge rate when the third EG site is located in the vector path of the cloud cover than when the third EG site is not located in the vector path of the cloud cover.

13. The method of claim 12 further comprising:

controlling, by the processor, an EG distribution profile for the third EG site based on the forecasted effect.

14. The method of claim 12 wherein the density of cloud cover at the first EG site exists at the second EG site when the density of cloud cover at the second EG site is within a threshold tolerance of the density of cloud cover at the first EG site.

15. The method of claim 12 wherein the vector path is calculated based on:
- a distance between the location of the first EG site and the location of the second EG site,
- a direction of the second EG site with respect to the first EG site, and
- the period of time corresponding to an amount of time it takes for the density of cloud cover at the second EG site to match the density of cloud cover at the first EG site.

* * * * *